United States Patent [19]

Kimura

[11] Patent Number: 5,287,275
[45] Date of Patent: Feb. 15, 1994

[54] IMAGE RECOGNITION APPARATUS AND METHOD FOR RECOGNIZING A PATTERN WITHIN AN IMAGE

[75] Inventor: Masayuki Kimura, Sendai, Japan

[73] Assignee: Fujitsu Limited, Kanagawa, Japan

[21] Appl. No.: 393,623

[22] Filed: Aug. 14, 1989

[30] Foreign Application Priority Data

| Aug. 20, 1988 | [JP] | Japan | 63-205685 |
| Aug. 20, 1988 | [JP] | Japan | 63-205686 |
| Aug. 20, 1988 | [JP] | Japan | 63-205687 |

[51] Int. Cl.$^5$ ............................................. G06F 15/38
[52] U.S. Cl. ............................ 364/419.01; 382/21; 382/39
[58] Field of Search ........................... 382/21, 13–16, 382/36, 39; 364/419

[56] References Cited

U.S. PATENT DOCUMENTS

| 4,040,009 | 8/1977 | Kadota et al. | 340/146.3 AQ |
| 4,757,551 | 7/1988 | Kobayashi et al. | 382/21 |
| 4,813,078 | 3/1989 | Fujiwara et al. | 382/21 |
| 4,850,026 | 7/1989 | Jeng et al. | 382/21 |

OTHER PUBLICATIONS

"A VQ Preprocessor Using Cepstral Dynamic Features for Large Vocabulary Word Recognition", Sadaoki Furui, Proceedings ICASSP 87: International Conference on Acoustics, Speech and Image Processings, Apr. 6–9, 1987, IEEE vol. 2, Dallas, Tex., pp. 1127–1130.
"Vector-Quantization-Based Preprocessor For Speaker-Independent Isolated Word Recognition", Kuk-Chin Pan et al, IEEE Transactions on Acoutics, Speech and Signal Processing, vol. 33, No. 3, Jun. 1985, New York, pp. 540–560.
Patent Abstracts of Japan, vol. 12, No. 284 (P-740), 1988 for JP-A 63-061388.
Systems & Computers in Japan, vol. 19, No. 2, pp. 42–49 (1988) "Rough Classification of Handwritten Characters by Divide-and Unify Method".

Primary Examiner—Gail O. Hayes
Attorney, Agent, or Firm—Nikaido, Marmelstein, Murray & Oram

[57] ABSTRACT

A learning pattern is classified into a plurality of patterns by a classifying means. The result of the classification, as well as the representative feature quantity calculated by the representative feature quantity operating unit, are stored in a dictionary storing unit in respective regions. Upon recognition, after feature quantities of unknown input patterns are extracted from the feature quantity extracting unit, the similarity operating unit arithmetically operates the similarity between the input pattern and respective learning patterns for respective regions. The point accumulating means searches a dictionary storing unit and accumulates points corresponding to a rank for respective learning patterns included in class having the upper rank from the highest to a lower similarity for respective regions. The recognition result candidate outputting unit outputs the recognition result candidate in accordance with the order of the higher accumulated point for the learning pattern. Therefore, the present pattern recognition can decrease the memory capacity of the dictionary and the number of the calculations.

18 Claims, 32 Drawing Sheets

HORIZONTAL MASK
(a)

VERTICAL MASK
(b)

45° MASK
(c)

135° MASK
(d)

| TABLE OF POINTS FOR AN INPUT CHINESE CHARACTER | | | | | |
|---|---|---|---|---|---|
| | POINT 5 | POINT 4 | POINT 3 | POINT 2 | POINT 1 |
| SMALL REGION 1 | 川 氵 乙… | 沼 火 洫… | 哈 牟 流… | 依 亿 扎… | 鸟 鹏 竹… |
| 2 | 邶 乙 刃… | 作 河 溇… | 非 肋 恪… | 危 危 汆… | 歺 乑 悠… |
| 3 | 邶 瓦 哭… | … | … | … | … |
| 4 | 邶 丝 佑… | … | … | … | … |
| 5 | 川 以 迁… | … | … | … | … |
| 6 | 屮 汊 蚴… | 邳 仞 蛇… | … | … | … |
| 7 | 邶 迁 瓦… | … | … | … | … |
| 8 | 灾 汆 纯… | 亚 卅 岸… | … | … | … |
| : | : | : | : | : | : |
| : | : | : | : | : | : |
| : | : | : | : | : | : |
| : | : | : | : | : | : |
| : | : | : | : | : | : |
| 46 | 邶 赖 街… | … | … | … | … |
| 47 | 北 沏 氐… | … | … | … | … |
| 48 | 蚯 开 帷… | 邶 丘 𠂉… | … | … | … |
| 49 | 邶 妣 蚝… | … | … | … | … |

CLASS : 20 CLASSES/I SMALL REGION

*Fig.18*

| FINE CLASSIFICATION TABLE OF EASILY MISTAKEN CHINESE CHARACTERS | | | | | | | | | | | | | | | |
|---|---|---|---|---|---|---|---|---|---|---|---|---|---|---|---|
| 2965 CHARACTERS | 川 | ... | 王 | ... | 王 | ... | 大 | ... | 太 | ... | 大 | ... | 人 | ... | 腕 |
| RELATIONAL CHARACTER | NULL | : | 玉 王 | : | 王 王 | : | 大 火 天 | : | 大 人 天 | : | 大 人 天 | : | 人 入 人 | : | NULL |
| SMALL REGION 1 | | | 0 | | 0 | | 1 | | 1 | | 1 | | 1 | | |
| 2 | | | 0 | | 0 | | 1 | | 1 | | 1 | | 1 | | |
| 3 | | | 0 | | 0 | | 1 | | 1 | | 1 | | 1 | | |
| 4 | | | 0 | | 0 | | 1 | | 1 | | 1 | | 1 | | |
| 5 | | | 0 | | 0 | | 1 | | 1 | | 1 | | 1 | | |
| 6 | | | 0 | | 0 | | 1 | | 1 | | 1 | | 1 | | |
| 7 | | | 0 | | 0 | | 1 | | 1 | | 1 | | 1 | | |
| 8 | | | 0 | | 0 | | 0 | | 0 | | 0 | | 0 | | |
| 9 | | | 0 | | 0 | | 0 | | 0 | | 0 | | 0 | | |
| 10 | | | 0 | | 0 | | 0 | | 0 | | 0 | | 0 | | |
| 11 | | | 0 | | 0 | | 0 | | 0 | | 0 | | 0 | | |
| 12 | | | 0 | | 0 | | 0 | | 0 | | 0 | | 0 | | |
| 13 | | | 0 | | 0 | | 0 | | 0 | | 0 | | 0 | | |
| 14 | | | 0 | | 0 | | 0 | | 0 | | 0 | | 0 | | |
| 15 | | | 0 | | 0 | | 0 | | 0 | | 0 | | 0 | | |
| 16 | | | 0 | | 0 | | 0 | | 0 | | 0 | | 0 | | |
| 17 | | | 0 | | 0 | | 0 | | 0 | | 0 | | 0 | | |
| 18 | | | 0 | | 0 | | 0 | | 0 | | 0 | | 0 | | |
| 19 | | | 0 | | 0 | | 0 | | 0 | | 0 | | 0 | | |
| 20 | | | 0 | | 0 | | 0 | | 0 | | 0 | | 0 | | |
| 21 | | | 0 | | 0 | | 0 | | 0 | | 0 | | 0 | | |
| 22 | | | 0 | | 0 | | 0 | | 0 | | 0 | | 0 | | |
| 23 | | | 0 | | 0 | | 0 | | 0 | | 0 | | 0 | | |
| 24 | | : | 0 | : | 0 | : | 0 | : | 0 | : | 0 | : | 0 | : | |
| 25 | | : | 0 | : | 0 | : | 0 | : | 0 | : | 0 | : | 0 | : | |
| 26 | | | 0 | | 0 | | 0 | | 0 | | 0 | | 0 | | |
| 27 | | | 0 | | 0 | | 0 | | 0 | | 0 | | 0 | | |
| 28 | | | 0 | | 0 | | 0 | | 0 | | 0 | | 0 | | |
| 29 | | | 0 | | 0 | | 0 | | 0 | | 0 | | 0 | | |
| 30 | | | 0 | | 0 | | 0 | | 0 | | 0 | | 0 | | |
| 31 | | | 0 | | 0 | | 0 | | 0 | | 0 | | 0 | | |
| 32 | | | 0 | | 0 | | 0 | | 0 | | 0 | | 0 | | |
| 33 | | | 0 | | 0 | | 0 | | 0 | | 0 | | 0 | | |
| 34 | | | 0 | | 0 | | 0 | | 0 | | 0 | | 0 | | |
| 35 | | | 0 | | 0 | | 0 | | 0 | | 0 | | 0 | | |
| 36 | | | 0 | | 0 | | 0 | | 0 | | 0 | | 0 | | |
| 37 | | | 0 | | 0 | | 0 | | 0 | | 0 | | 0 | | |
| 38 | | | 0 | | 0 | | 0 | | 0 | | 0 | | 0 | | |
| 39 | | | 0 | | 0 | | 0 | | 0 | | 0 | | 0 | | |
| 40 | | | 0 | | 0 | | 0 | | 0 | | 0 | | 0 | | |
| 41 | | | 1 | | 1 | | 0 | | 0 | | 0 | | 0 | | |
| 42 | | | 0 | | 0 | | 0 | | 0 | | 0 | | 0 | | |
| 43 | | | 0 | | 0 | | 0 | | 0 | | 0 | | 0 | | |
| 44 | | | 0 | | 0 | | 0 | | 0 | | 0 | | 0 | | |
| 45 | | | 0 | | 0 | | 1 | | 1 | | 1 | | 1 | | |
| 46 | | | 0 | | 0 | | 1 | | 1 | | 1 | | 1 | | |
| 47 | | | 0 | | 0 | | 0 | | 0 | | 0 | | 0 | | |
| 48 | | | 0 | | 0 | | 0 | | 0 | | 0 | | 0 | | |
| 49 | | | 0 | | 0 | | 0 | | 0 | | 0 | | 0 | | |

*Fig.19*

| MASK $W_K$ \ | $\psi_1$ | $\psi_2$ | . . . . | $\psi_M$ |
|---|---|---|---|---|
| $W_1$ | CLASS l | CLASS i | . . . | CLASS k |
| $W_2$ | CLASS s | CLASS t | . . . | CLASS r |
| . | . | . | . . . | . |
| . | . | . | . . . | . |
| . | . | . | . . . | . |
| $W_N$ | CLASS l | CLASS x | . . . | CLASS p |

DICTIONARY WORD →

*Fig. 26*

IMAGE RECOGNITION APPARATUS AND METHOD FOR RECOGNIZING A PATTERN WITHIN AN IMAGE

BACKGROUND OF THE INVENTION

1. Field of the Invention

The present invention relates to a recognition apparatus for extracting a feature quantity from an input pattern comprising an image pattern such as a typed or hand-written pattern or a speech signal pattern such as word feature quantity pattern and for recognizing the pattern, and to a method for extracting the feature quantity.

2. Description of the Related Art

A feature quantity is extracted from an unknown image pattern (such as a typed or hand-written pattern) and a speech signal pattern (such as a time variable pattern of a frequency envelope of an unknown word) and a recognition of these unknown input patterns is conducted. A method for matching this feature quantity with a feature quantity of a previously-stored learning dictionary pattern and thus determining the dictionary pattern with the highest similarity to the input pattern as the recognition result, is generally known.

A prior art method for performing a matching of one unknown input pattern with a plurality of learning dictionary patterns is as follows. A set of feature quantities, extracted from an unknown input pattern, and a set of feature quantities representing the whole feature of a pattern are stored as a dictionary pattern. Respective sets of feature quantities of the dictionary pattern are matched with a set of feature quantities of the unknown input pattern so that all the sets of feature quantities of the dictionary patterns are matched with a set of feature quantities of the unknown input pattern. The dictionary pattern is arranged in order of the highest to lowest similarity of the feature quantity to provide recognition candidates. This is the "usual pattern matching method".

In the above prior art, when a lot of image data is to be recognized, a lot of data is required to enable feature quantities to be extracted from one pattern. Thus, the quantity of data required to express a pattern is very large. About 3000 Japanese image data are required to recognize one Japanese type. Thus, a great amount of memory capacity is required to store feature quantities of all Japanese type image data, resulting in high cost.

As feature quantities of unknown input patterns are matched with all the feature quantities of respective dictionary patterns of 3000 types, the prior art requires an extremely long recognition time and has a bad response capability.

On the other hand, where a single unknown input pattern is matched with a learning dictionary pattern to recognize a word, it is important to compare appropriate feature quantities of the unknown input pattern and learning dictionary pattern, because the respective patterns comprise a plurality of feature quantities.

The first prior art for the matching method is as follows. Time sequence patterns of feature quantities of unknown input words are made to correspond to the time sequence patterns of the feature quantities of the learning word, starting from the beginning of respective words, and similarities (distances) between respective feature quantities are calculated. The sum of the similarities between respective feature quantities of the whole time sequence pattern is obtained and the similarity between the words is calculated. This calculation is performed for all the learning words and the one having the highest similarity (i.e. the smallest distance) is provided as the recognition result.

Generally, words have different lengths as the time taken to pronounce words is not constant. Therefore, as the above first prior art does not consider differences in word length, it cannot achieve a high recognition ratio.

A DP (dynamic programming) method is provided as the second prior art. This method expands or compresses, nonlinearly in the time direction, respective time sequence patterns of feature quantities of the unknown input words and respective time sequence patterns of the feature quantity of the learning word. It then repeats the calculation of distance between respective feature quantities and calculates the accumulated distance for respective words. This calculation is applied to all the learning words and the one having the smallest accumulated distance is determined to be the recognition result.

The above second prior art considers differences in length and can achieve a high recognition ratio. It requires a lot of calculation as it needs to expand and compress the time axis non-linearly for respective words. In particular, when this calculation is repeated for all the learning words, the total amount of calculation is extremely large, making it difficult to perform realtime processing.

Both first and second prior arts, which require a matching for all the learning words recited above, have the basic problem that a large amount of calculation is required.

To solve this problem, there is proposed a method of roughly classifying the unknown input words to focus the word candidate, and performing a fine recognition on a limited number of word candidates. In this case, the prior art cannot provide a recognition method which focusses the word candidate sufficiently quickly and accurately. As a result, it cannot easily realize a quick word recognition method with a high recognition ratio.

Extraction of a feature quantity constitutes the basis of pattern matching. A feature quantity expressing the feature of the pattern must be extracted efficiently from a type image pattern or word signal pattern (which is obtained by expressing a time variable pattern of the frequency envelop in a form of an image) to enable recognition of the pattern.

In the first prior art for extracting a feature quantity, the density or direction of strokes in many directions is extracted.

However, this prior art has the problem that it cannot easily reflect the structure of a complex pattern (such as a complex Chinese character in Japanese) by the density of strokes. For example, it cannot express a pattern having a structure of many short strokes by the density of strokes.

The second prior art is a so-called structure segmentation method, in which the pattern is recognized by separating local structure segments. For example, the Chinese characters, "hen" and "tsukuri" constitute parts of a composite Chinese character, and these parts are separated from each other for recognition.

However, the above second prior art needs to examine all the structure segments and it takes time to extract the feature quantity. It also needs to separate and recognize respective structure segments and thus it is not effective when noise is present. It cannot be applied to patterns which have single structure segments, namely, patterns such as the 「 川 」, 「 大 」, 「 人 」 in Chinese characters in Japanese. Further, in some characters the structure segments have the same shape but different size, for example, 「 イ 」, in 「 化 」, and 「 他 」. This makes it difficult to form a pattern with a standard feature quanity.

Therefore, the second prior art cannot provide a pattern recognition system with high capability.

SUMMARY OF THE INVENTION

The present invention is made in consideration of the above situation and an object is to realize a pattern recognition system whose dictionary memory capacity is small, whose recognition candidate can be accurately extracted to provide a high recognition capability, and whose time is greatly improved.

Another object of the present invention is to provide a pattern recognition system in which a feature quantity, which accurately reflects the pattern structure, can be extracted without requiring recognition of the structure segment, thereby providing a better pattern-recognition capability.

According to a feature of the present invention a pattern recognition apparatus for extracting a feature quantity from the input pattern and recognizing the pattern has the following structures.

The feature quantity extracting unit extracts feature quantities from so many regions of an input pattern that may reflect the partial structure of the pattern. For example, the type image data is divided into a plurality of regions and a feature quantity such as the direction components of the line element of the type pattern is extracted from respective regions.

Next, the classifying unit classifies a plurality of learning patterns for these regions. The learning patterns are based on the feature quantities of respective regions extracted from the feature quantity extracting unit. The feature quantities of respective regions are subjected to a clustering.

A representative feature quantity operating unit statistically determines the representative feature quantities of respective classes and, for example, the average of the feature quantities of the respective classes.

The dictionary storing unit stores the representative feature quantities of respective classes and the learning patterns included in respective classes, as a dictionary for respective regions and, for example, comprises a ROM.

A similarity operating unit statistically determines a similarity between a feature quantity extracted from the feature quantity extracting unit for respective regions for the unknown input pattern and a representative feature quantity of respective classes corresponding to the dictionary memory unit. It then, for example, determines the euclidean distance between the feature quantity of the unknown input pattern and the representative feature quantity.

A point accumulating unit searches a dictionary memory unit and accumulates points, corresponding to the order of classes up to the upper predetermined order, from the highest to the lowest similarity for respective regions.

A recognition-result candidate-outputting unit outputs recognition result candidates of the learning pattern in the order of the highest to the lowest point after the accumulation operation by the point accumulating unit is completed for all the regions.

According to the first feature of the present invention, the learning pattern is divided into a plurality of regions. Respective classified regions greatly decrease the memory capacity of the dictionary in which only the representative feature quantities of respective classes are stored. On the other hand, a calculation of the similarity between an unknown input pattern and the learning pattern may be conducted upon recognition for representative feature quantities of respective classes for respective regions. The quantity of data for the feature quantity for respective regions decreases in accordance with the number of divisions. The amount of calculation is much less than for the case where the similarity between the feature quantities of the unknown input pattern and all the learning patterns are calculated. Further, where a total similarity, within the unknown input pattern and respective learning patterns, is obtained, the similarity between respective classes with regard to respective regions is calculated. An accumulation of points is applied only to the learning patterns included in the classes of the upper orders of similarity. Thus, the amount of calculation may be smaller than where the sum of the similarities is obtained for respective learning patterns.

Next, according to the second feature of the present invention, the pattern recognition apparatus for extracting the feature quantity from the input word pattern and for performing the recognition of the input word has the following structure.

First, the feature quantity extracting unit extracts the feature quantity from respective parts of a plurality of parts of the input word pattern. Cepstrum coefficients, obtained for respective frames of a plurality of frames, are collected and grouped, and are extracted as feature quantities of respective parts of the input word pattern. The classifying unit, the representative feature quantity operating unit, the dictionary storing unit and the similarity operating unit of the second feature are the same as those of the first feature.

The classifying unit classifies a plurality of word learning patterns based on the feature quantities of respective parts extracted from the feature quantity extracting unit for a plurality of learning word patterns.

The representative feature quantity operating unit statistically determines the representative feature quantities of respective classes.

The dictionary storing unit stores the representative feature quantities of respective classes and the kind of learning word patterns included in respective classes for respective portions.

The similarity operating unit statistically determines the similarity between the feature quantities of respective parts extracted by the feature quantity extracting unit from the unknown input word pattern and the representative feature quantity of corresponding respective classes in the dictionary storing unit.

Next, the rough classification unit statistically determines the similarity between respective learning word patterns stored in the dictionary storing means based on the above similarity and unknown input word patterns. It then outputs rough classification word candidates with a rank in accordance with the order of the highest to the lowest similarity of the learning word pattern. This rough classification unit may comprise a point accumulating unit and a recognition result candidate output unit as shown in the first feature.

A vowel sequence recognition unit recognizes the vowel sequence of the unknown input word pattern.

The feature quantity of the unknown input word pattern, for example, is matched with respective feature quantities of the five Japanese vowels.

A vowel sequence dictionary storing unit stores the vowel sequences of respective learning word patterns as a dictionary.

The fine classification unit performs respective DP matchings of the vowel sequences of respective learning word patterns corresponding to the rough word candidates extracted from the vowel sequence dictionary storing unit, and the vowel sequence of the unknown input word pattern from the vowel sequence unit. It then outputs the fine classification word candidate with a rank in the order of the highest to the lowest degree of matching from the rough word candidates.

The required memory capacity of the dictionary in the second feature can be greatly decreased for the same reason as it is in the first feature. When the word recognition is conducted based on the word candidate according to the second feature, the rough classification candidate is obtained from the rough classification process. The rough classification is selected by the fine classification process to provide a fine classification word candidate. This two-stage method enables calculation of the word candidate to be conducted at high speed and accurately. The final recognition, such as DP matching, is again applied to the fine classification word candidates whose numbers are limited by the above process. Thus, this process can realize a word recognition system in which the amount of calculation is greatly reduced and the recognition ratio is equal to or higher than the recognition method in which DP matching, for example, is employed from the beginning.

BRIEF DESCRIPTION OF THE DRAWINGS

The other objects and features of the present invention will be easily understood by a person skilled in the art from the description of the preferred embodiment together with the attached drawings.

FIG. 18 shows an example of the recognition operation according to the associative matching method, FIG. 19 is an example of a fine classification table, FIG. 26 is a diagram of the word dictionary.

DESCRIPTION OF THE PREFERRED EMBODIMENTS

Explanation of the First Principle

Figure 1A:
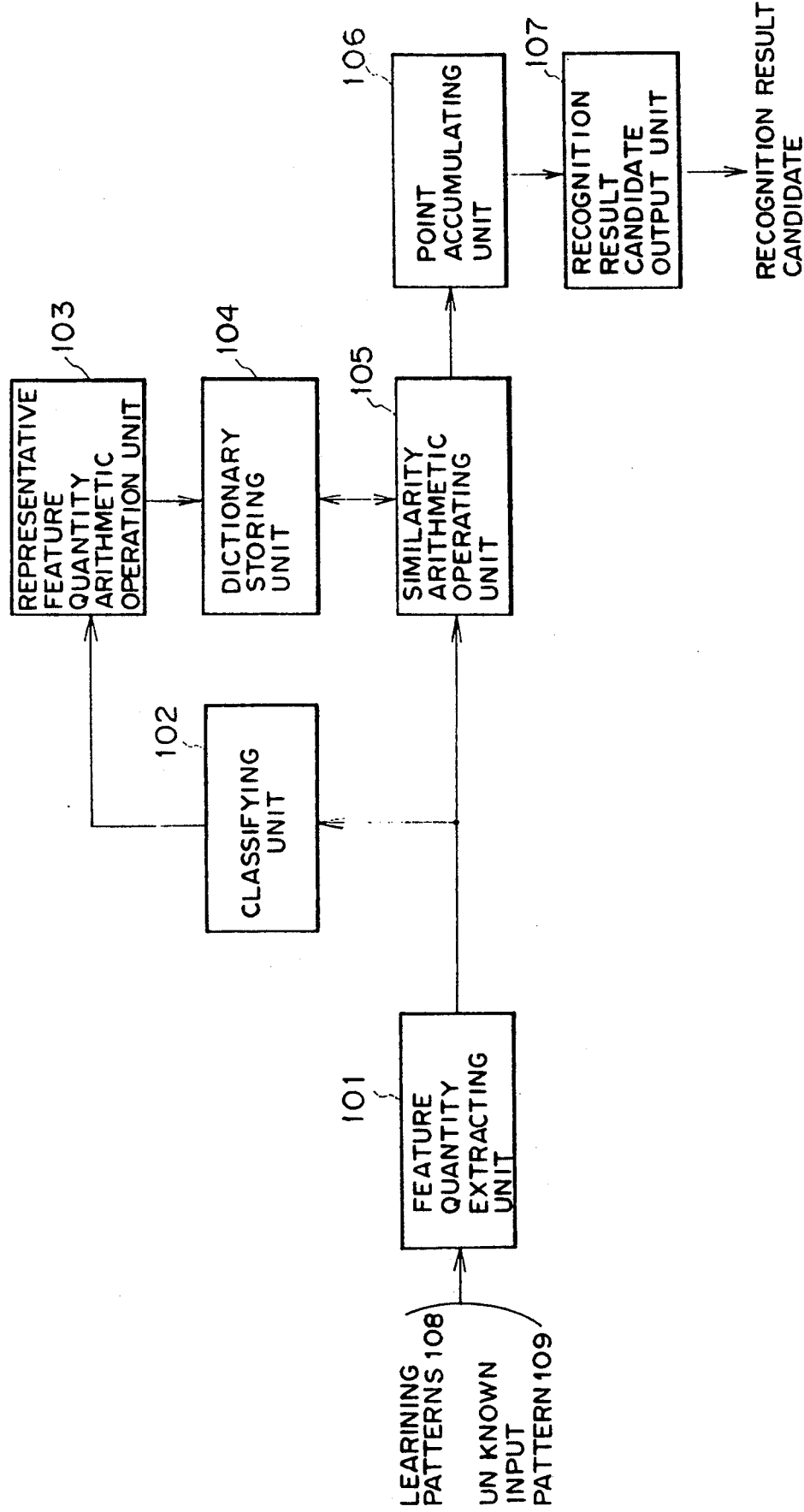
FIG. 1A is a block diagram showing the first principle structure of the present invention.
Figure 1B:
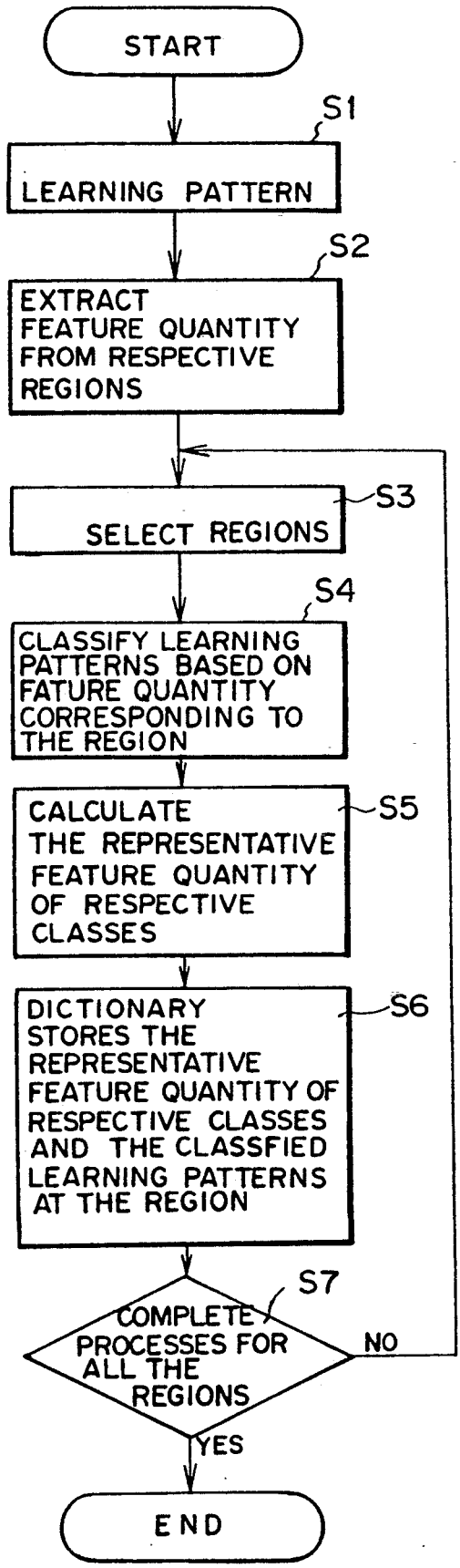
FIG. 1B is a flowchart showing the operation of the dictionary forming process of the first principle.
Figure 1C:
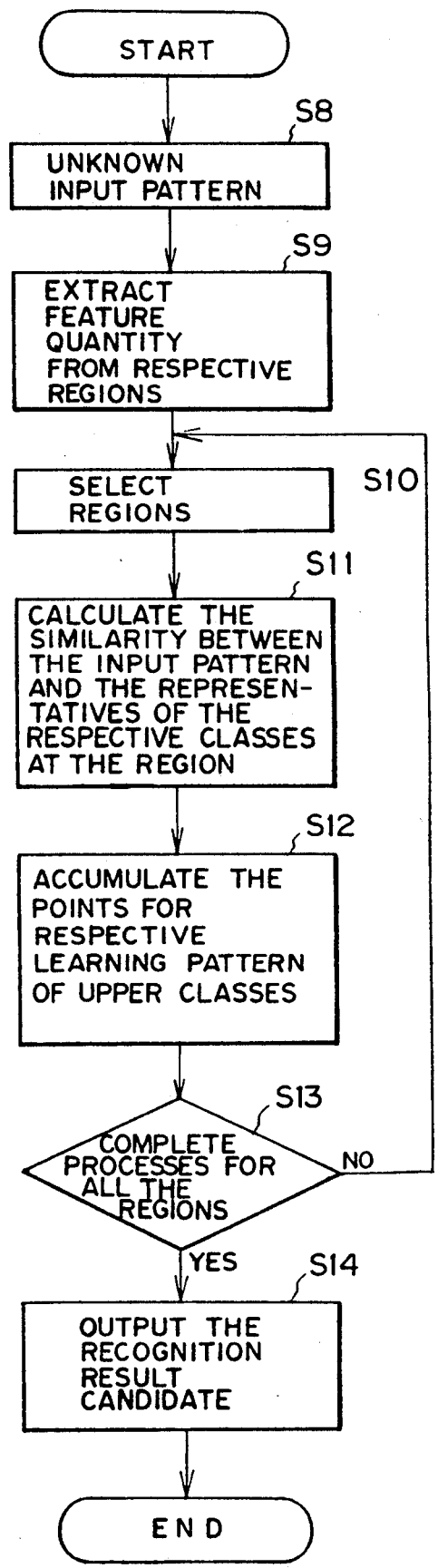
FIG. 1C is a flowchart showing the operation of the recognition process according to the first principle.

FIGS. 1A to 1C show views which illustrate the first principle of the present invention. FIG. 1A is a block diagram.

Feature quantity extracting unit 101 extracts feature quantities from respective regions of a plurality of regions of an input pattern. For example, the type image data is divided into a plurality of regions and a feature (for example, direction) of a line of a type pattern is extracted from respective regions.

Classifying unit 102 is used with a dictionary. Feature quantities are extracted from feature quantity extracting unit 101 for respective regions for a plurality of learning patterns 108. Thereafter, a plurality of learning patterns are classified into some classes at respective regions. For example, feature quantities of respective regions are subjected to a clustering operation.

Representative feature quantity arithmetic operation unit 103 is used with a dictionary. Representative feature quantities of respective classes classified into respective regions by the classifying unit 102 are statistically determined. For example, the average of the feature quantities of a region corresponding to learning pattern 108 included in respective classes is calculated to provide a representative feature quantity.

Dictionary storing unit 104 stores the representative feature quantity of respective classes and the kinds of learning patterns included in respective classes, as a dictionary for respectively defined regions. This unit comprises, for example, a ROM (read only memory) or a disk memory apparatus.

Similarity arithmetic operating unit 105 is used upon recognition of unknown input pattern 109. Feature quantity extracting unit 101 extracts feature quantity from a particular region. Thereafter, the similarity between the unknown input pattern and the representative feature quantities of respective classes corresponding to the regions of dictionary storing unit 104 are statistically determined. For example, the euclidean distance between the feature quantities are determined.

Similarly, point accumulating unit 106 is used upon recognition of an unknown input pattern 109 and similarity operating unit 105 is considered so that dictionary storing unit 104 searches learning patterns included in classes located in the upper sequence of the similarity in respective regions and the point corresponding to the rank within the class is calculated. For example, the learning patterns included in the classes of the upper five ranks of a small euclidean distance accumulate points. The first rank is 5 points, the second rank is 4 points fifth rank is 1 point.

Recognition result candidate output unit 107 is used upon recognizing the unknown input pattern 109. After an accumulation operation in respective regions is completed by point accumulating unit 106, recognition result candidate 110, whose order is sequentially output from the learning pattern in which the number of accumulated points is highest, is sequentially output as the recognition result candidate 110.

The operation of the first principle structure is explained by referring to FIGS. 1B and 1C.

First a dictionary-forming process, which should be performed before a recognition process, is explained by referring to FIG. 1B. Feature quantity extracting unit 101 (FIG. 1A) sequentially inputs a plurality of learning patterns 108 (FIG. 1B, S1) and extracts feature quantities of the whole learning pattern 108 from respective regions by dividing the respective patterns into a plurality of regions of the same type (FIG. 1B, S2).

Classifying unit 102 sequentially selects a region from the prespecified regions (S3) and carries out a classification of a plurality of learning patterns into a prespecified number of classes based on feature quantities of learning patterns corresponding to the region (S4).

Thereafter, representative feature quantity calculation unit 103 determines the representative feature quantity of respective classes classified by the above process (S5).

Dictionary storing means 104 stores these representative feature quantities and the classified learning patterns (labels or codes) at the region (S6).

Processes S3 to S6 are carried out independently for a plurality of regions (S7→S3). Then, when all the processes are completed, the dictionary is completed.

The above process classifies the whole learning patterns into a prespecified number of classes, thereby greatly decreasing the capacity of the dictionary because it only needs to store the representative feature quantities of respective classes. A feature quantity is stored for each class of the respective regions but the amount of data necessary for an expression of the feature quantity for a region is decreased according to the number of divisions in the region. Thus, the total required memory capacity is less than that where the feature quantities of all the learning patterns are stored. The memory capacity required to store the label of the learning pattern included in respective classes is small compared with the memory capacity of the feature quantity. Thus, the memory capacity of the dictionary as a whole can be decreased.

Next, the recognition process is explained by referring to FIG. 1C.

Feature quantity extracting unit 101 inputs unknown input pattern 109 (FIG. 1C, S8) and divides it into the same number of regions as the learning pattern, thereby enabling a feature quantity to be extracted from each region (S9).

Next, similarity calculating unit 105 sequentially selects a region (S10) and the similarity calculation between the feature quantity of unknown input pattern 109 corresponding to the region in the dictionary storing unit 104 and the representative feature quantity of respective classes in the region is determined (S11). Each region includes a plurality of classes and each class has a representative feature quantity.

Thereafter, point accumulating unit 106 searches the learning patterns included in classes up to the upper predetermined rank in similarity, in dictionary storing unit 104 and accumulates the points for each learning pattern, which correspond to the order of respective classes (S12).

Processes S10 to S12 are carried out independently with regard to a plurality of regions (S13→S10) and this is called associative matching recognition.

After the accumulation operation for all the regions is completed, recognition result candidate output unit 107 outputs the recognition result candidate 110 in accordance with the rank of the candidate, beginning with the learning pattern with the largest number of accumulated points, and then the recognition process is completed (S13→S14).

The above recognition process executes the similarity calculation between the unknown input pattern and the learning pattern only with regard to the representative feature quantity of respective classes for each respective region. The feature data quantities of respective regions decrease according to the number of divisions and the calculation amount is much less than for the case where the similarity is calculated for the feature quantities of all the learning patterns. Further, where the similarities of respective classes in respective regions are calculated and the total similarity of the respective learning patterns is obtained, the accumulation is applied in the form of points only to the learning pattern included in the class of the predetermined high ranks in which the similarity is highest. Thus, the number of calculations may be smaller than when the sum of the similarities is obtained for each learning pattern.

Explanation of the Second Principle

Figure 2A:
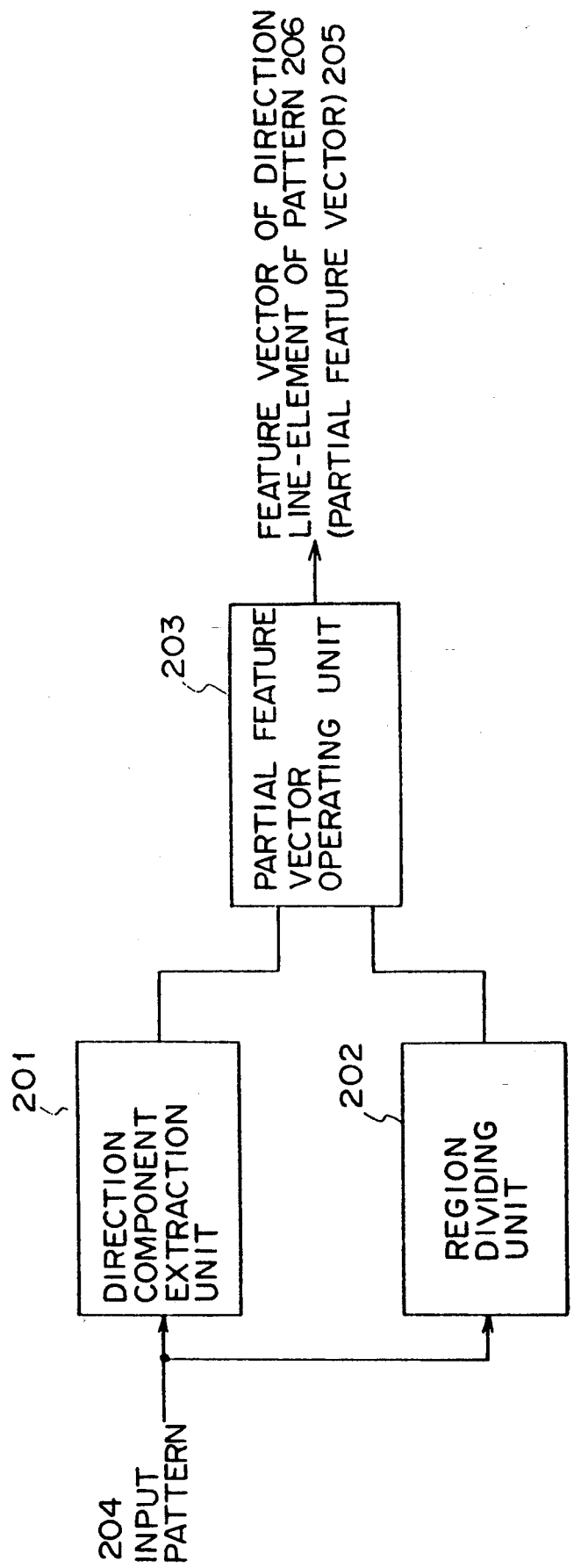
FIG. 2A is a block diagram showing the second principle structure of the present invention.
Figure 2B:
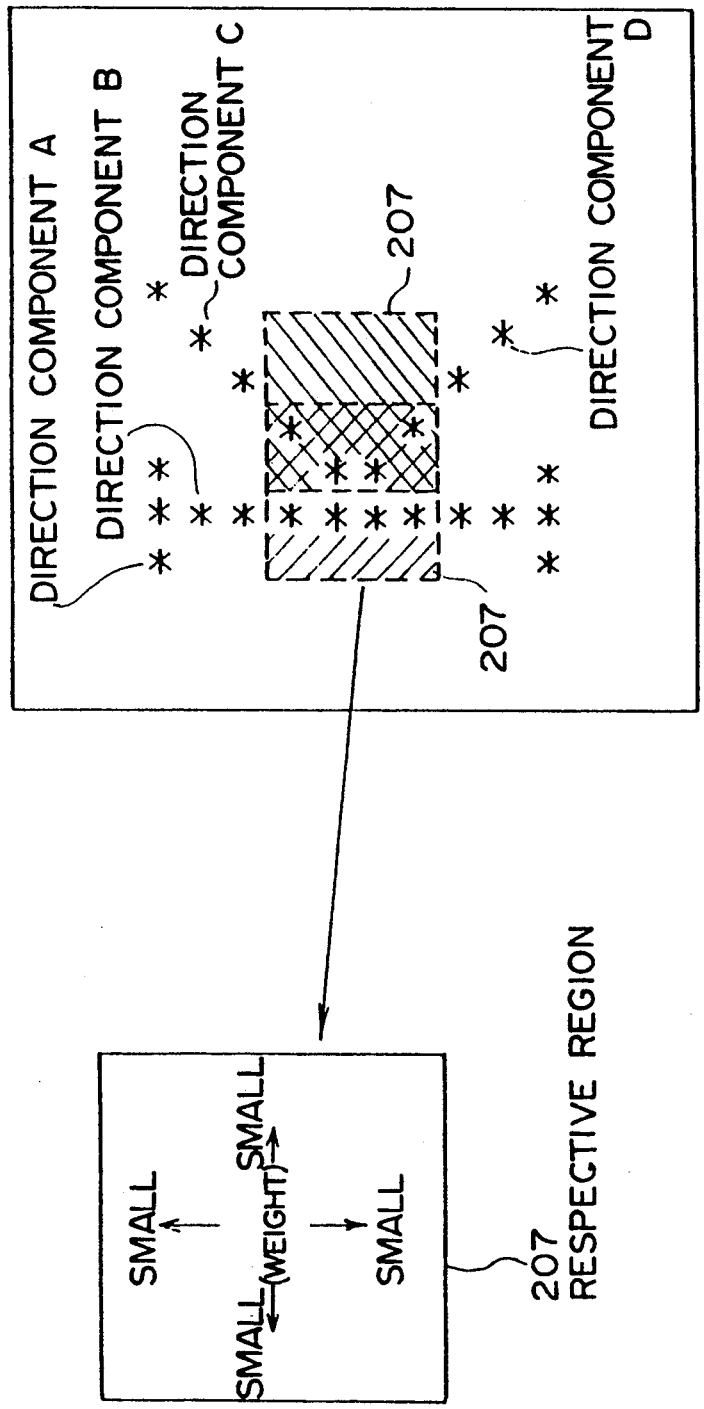
FIG. 2B is a diagram showing the operation of the second principle.

FIGS. 2A and 2B show the second principle of the present invention.

The principle is related to the invention in which the feature quantity extracting unit 101 of FIG. 1A extracts the feature quantity of the input pattern. FIG. 2A shows a block structure.

Direction component extracting unit 201, for respective dots of a two dimensional input pattern, extracts a direction component of the dot surrounded by adjacent dots, the dot representing the pattern. A plurality of windows for extracting the direction component having a constant direction are prepared and respective dots of the input pattern 204 are scanned.

Region dividing unit 202 divides input pattern 204 into a plurality of overlapping regions. For example, on input pattern 204, the region of M times M dots is sequentially designated by overlapping M/2 dots of one region with M/2 dots of the adjacent region.

Partial feature vector operating unit 203 totals direction components obtained from direction component extracting unit 201 for respective dots in respective regions divided by the region dividing unit 202, by applying a smaller weight from the center of the region to the periphery in different directions. Partial feature vector 205 is determined by enabling the result of the totaling in each direction to be an element of the partial feature vector. For example, when a certain direction component is extracted from respective dots in a region, the numeral value corresponding to the weight of the portion is accumulated in a register for accumulating the direction components.

The partial feature vector 205 of the whole region obtained by the above means is finally extracted as pattern direction line element feature quantity 206.

The operation of the second principle structure will be explained by referring to the operational drawing of FIG. 2B.

Suppose that the input pattern 204 is a pattern represented by "*" for respective dots in FIG. 2B and is the Roman letter "k". This input pattern 204 is input to direction component extracting unit 201 and a statistically determination is executed to determine which direction component respective dots designated by "*" have. For example, dots having a horizontal pattern have the direction component A, the vertical pattern has the direction component B, the 45-degree pattern has the direction component C and the 135-degree pattern has the direction component D (as shown in FIG. 2B), thereby enabling the direction component to be extracted for respective dots. When the "*" pattern does not exist, the direction component is not applied.

The region dividing unit 202 sequentially designates a plurality of overlapping regions 207 as shown in FIG. 2B, in the input pattern 204.

The direction component of respective dots in the input pattern 204 included in the respective region 207 designated as recited above are totaled in respective directions.

In this case, as shown in FIG. 2B, a weight is determined a respective positions of region 207. This weight decreases from the center to the periphery of the region. When the direction component A, for example, is extracted from a dot in a region 207 currently designated on the input pattern 204, the numeral values corresponding to the weights determined for the portion in the register for the direction component A are accumulated. Namely, larger values are accumulated in the registers corresponding to the direction component extracted near the center of the region 207.

When this operation is completed for a region 207, partial feature vector 205 having an accumulation result of respective direction components as an element is output. Namely, in the example in FIG. 2B, the partial feature vector 205 having the accumulation result in the direction component A as an element is output. Similarly, the partial feature vector 205 has the accumulation results in the direction components B, C and D as the elements.

The above operation is repeated for all the regions on the input pattern 204 designated by the region dividing unit 202 and a collection of the partial feature vector 205 thus obtained is finally output as pattern direction line element feature quantity 206.

In the above operation, partial feature vector 205 corresponding to respective region 207 represents the features of the partial information corresponding to respective regions 207 of the input pattern 204 of FIG. 2B. Accordingly, in the Chinese character pattern in Japanese, the information corresponding to the partial pattern such as "hen" or "tsukuri" of the Chinese character can be obtained without requiring the recognition of their partial patterns and without going through a complex algorithm.

In this case, by providing regions 207 with a weight, the partial feature vector 205 and pattern direction line element feature quantity 206 can clearly reflect the position and direction of the pattern and the weight may be made small for a pattern near the boundary of the region 207. Furthermore, the contribution ratio of the boundary of region 207 to the extraction of the portion feature vector may be made lower, thereby enabling an appropriate process to be conducted for an unstable pattern which may be entered into the adjacent region.

Further, by applying a weight to the designation position of region 207, the region may be evaluated based on the same weight even if the position of the pattern is slightly shifted, thereby enabling stable extraction of the pattern direction line element feature quantity 206 to be carried out.

The above principle may be applied to the feature quantity extraction unit 101 of the pattern recognition method based on the first embodiment shown in FIG. 1A, thereby increasing pattern recognition accuracy.

Explanation of the Third Principle

Figure 3:
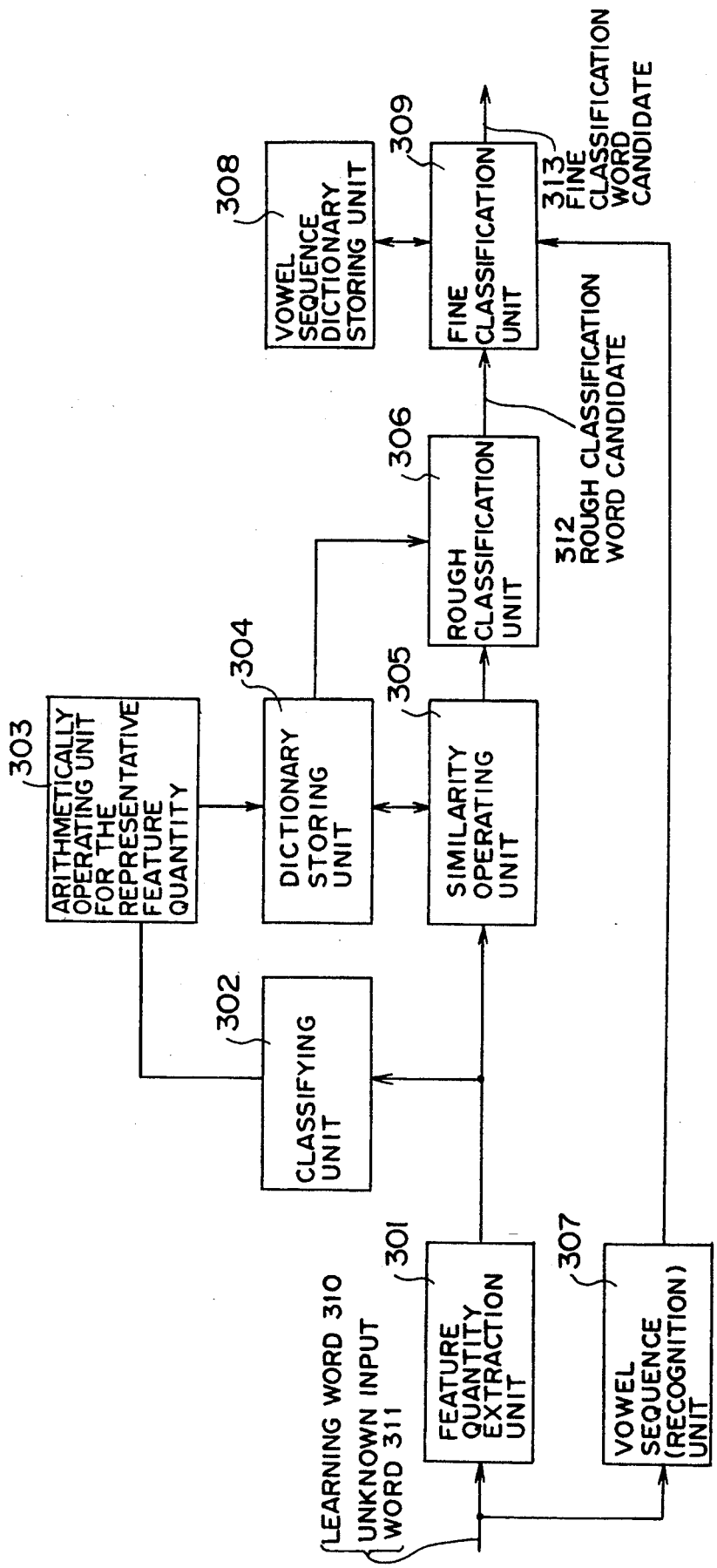
FIG. 3 is a block diagram showing the third principle structure of the present invention.

FIG. 3 illustrates the third principle of the present invention.

This is to apply the pattern recognition apparatus of the present invention to word recognition.

Feature quantities extraction unit 301 extracts feature quantity from respective input words. Feature vectors such as cepstrum coefficients are calculated for each frame obtained by cutting out the input word in units of a predetermined calculated time period and thereafter the input word is divided into a plurality of parts (partial pattern). The average of the feature vectors is obtained for respective parts and the feature quantity for respective parts is thereby calculated.

Classifying unit 302 is used upon preparing a dictionary. It classifies a plurality of learning words 310 for respective pattern portions after the feature quantity extracting unit 301 extracts the feature quantity from a plurality of learning words 310 for respective partial patterns. For example, a clustering of the feature quantity for respective parts can be carried out.

An operating unit 303 is used to prepare a dictionary and statistically determine the representative feature quantity (standard partial pattern) for respective classes classified into respective parts by the classifying unit 302. The average of the feature quantities of the part corresponding to the learning word 310 included in the respective classes, for example, is calculated to provide the representative feature quantity.

Dictionary storing unit 304 stores the representative feature quantity for respective classes and the learning word included in respective classes as a dictionary for respective parts. They are stored, for example, in a ROM (read only memory) or a disk storing unit.

Next, similarity operating unit 305 is used to recognize an unknown input word 311. After feature quantity extracting unit 301 extracts the feature quantity for respective portions of the unknown input word 311, the similarity operating unit 305 statistically determines the similarity between the feature quantity for respective portions of the unknown input word and the representative feature quantities of respective classes corresponding to the parts in the dictionary storing unit 304 for respective parts. For example, the euclidean distance between feature quantities is determined.

Rough classification unit 306 is also used to recognize the unknown input word 311. It statistically determines the similarity between respective learning words 310 stored in the dictionary storing unit 304 and the unknown input word 311, based on the similarity determined by the similarity operating unit 305. It thereby outputs the learning word which has the higher similarity, in accordance with the order of similarity. The classes in which the respective parts of the learning word 310 are included are obtained by referring to dictionary unit 304. Similarity operating unit 305 refers to and extracts the similarity statistically determined by the similarity operating unit 305. The sum of the similarities extracted from all the portions is calculated, thereby determining the similarity of the learning word 310. This process is repeated for all the learning words 310. The rough classification unit 306 produces a learning word in accordance with the degree of similarity selected from among the similarities of respective learning words 310.

On the other hand, vowel sequence recognition unit 307 is used for fine classification processing after the rough classification process is completed by rough classification recognition unit 306. The vowel sequence of the unknown input word 311 is recognized independently of the above process. For example, the feature quantity of the previously-stored five Japanese vowels is matched with the feature quantity for respective frames of the unknown input word 311. Thus, the vowel sequence is recognized and extracted from respective frames.

Vowel sequence dictionary storing unit 308 stores the intra-word vowel sequence of respective learning words 310 as a dictionary.

The fine classification unit 309 is used after the rough classification process by the rough classification unit 306. It extracts the vowel sequence of the respective rough classification word candidate 312 output from the rough classification unit 306 from vowel sequence dictionary storing unit 308. Respective DP matchings are conducted between the vowel sequence of respective rough classification word candidates 312 and the vowel sequence of the unknown input word 311 output from the vowel sequence recognition unit 307, thereby producing a rough classification word candidate having a high a degree of matching as the fine classification word candidate 313 which has the sequence order.

The operation of the third principle is explained hereinafter.

First the process of preparing the dictionary is explained as this process should be done before the rough classification process.

1. Feature quantity extracting unit 301 sequentially inputs a plurality of learning words 310. It then divides respective learning word 310 into a plurality of equal-sized parts and extracts feature quantities of the whole learning word 310 for respective parts.

2. A classifying unit 302 sequentially determines respective parts of a plurality of learning words 310 and classifies them based on the feature quantities of respective learning words.

3. thereafter representative feature operating unit 303 determines the representative feature quantity of respective classes. This quantity is obtained by classification using the above process.

4. The representative feature quantity of respective classes and the type of learning word included in respective classes are stored in dictionary storing unit 304.

The above processes 2 to 4 are carried out independently of a plurality of respective parts. When all the processes are completed, the process of forming a dictionary is ended.

With regard to the process recited above, the learning word is divided into a plurality of parts and classified into the prespecified number of classes for respective parts. In the dictionary, only the representative feature quantity is stored for each class so that the capacity of the memory is decreased corresponding to the number of classifications compared with the case where the whole feature quantities of learning word 310 are stored.

The memory capacity for the label of the learning patterns included in the respective classes is small compared with that of the feature quantity, and the memory capacity of the dictionary can be decreased.

The rough classification process will be explained.

5. Feature quantity extracting unit 301 inputs unknown input word 311 and divides it into a plurality of parts in the same manner as the learning word 310 is divided into a plurality of parts, thereby extracting the feature quantity for respective portions.

6. Similarity operating unit 305 sequentially determines the similarity of a plurality of respective parts and statistically determines the similarity between the feature quantity of the unknown input word 311 corresponding to the part and the representative feature quantity of respective classes corresponding to the above part in dictionary memory unit 304.

7. Process 6 is repeated for all the parts.

8. Thereafter, rough classification unit 306 statistically determines the similarity from the similarity of the classes for respective parts, in which the learning word is included, for the learning word 110 stored in the dictionary storing unit 304.

9. Process 8 is repeated for all the learning words.

10. As a result of process 9, the similarities of the learning words are ranked in the order of highest to lowest and are output as a rough classification word candidate 312.

Calculation of the similarity between the unknown input word 311 and learning word 310 by the rough classification may be conducted only for a feature quantity of a part of the unknown input word and a representative feature quantity of respective classes for the corresponding parts of the learning word. Thus, the number of calculations may be greatly decreased compared with that required to determine the similarity between the partial feature quantity of the unknown input word and the corresponding partial feature quantity of all the learning words 310 without classifying the feature quantities.

Next, the fine classification process is explained.

11. The vowel sequence of unknown input words 311 are recognized by vowel sequence recognition unit 307 independently of the above rough classification process.

12. The rough classification word candidate 312 output from the rough classification unit 306 by the above rough classification process is input to the fine classification unit 309. The vowel sequences of rough classification word candidates 312 are then extracted by referring to the vowel sequence dictionary storing unit 308.

13. DP matching is performed between the vowel sequence corresponding to the respective rough classification word candidate 312 and the vowel sequence of the unknown word 311 output from vowel sequence recognition unit 307, the vowel sequence being selected from the extracted vowel sequence.

14. The process of step 13 is repeated for all the rough classification word candidates 312.

15. As a result of the above 14 processes, the learning word is ranked in the order of highest to lowest matching degree and is output as a fine classification word candidate 313.

The order of the rough classification word candidate 312 selected by the rough classification process is selected by the fine classification process, thereby providing the fine classification word candidate 313, which is finally accurately ordered in rank. In this case, the rough classification word candidates 312 are originally selected or limited to about ten candidates. The number of vowel sequences per word candidate is not so large (i.e. several). Therefore, DP matching between the vowel sequence of the rough classification word candidate 312 and the vowel sequence of the unknown word speech 311 can be carried out at a high speed.

As described above, where the word is recognized based on the word candidate determined by the third principle, rough classification word candidate 312 is obtained by the rough classification process. Further, the rough classification word candidate 312 is selected or limited by the fine classification process to provide the fine classification word candidate 313. Such a two-stage method enables calculation of the word candidate to be conducted accurately at high speed. The fine classification word candidate 313 for limiting or selecting the number of candidates as described above, is again subjected to DP matching and so on to provide a final recognition. Therefore, compared with the recognition method in which DP matching is conducted from the beginning, the word speech recognition system in which a large number of calculations is required and the recognition ratio equal to or higher than that of the previous prior art method can be realized.

A plurality of vowel sequence candidates is produced as a vowel sequence of the unknown input word 311 output from the vowel sequence recognition unit 307. DP matching with the vowel sequence of respective rough classification word candidates 312 by the fine classification recognition means 309 can be conducted for a plurality of vowel sequence candidates, thereby minimizing the adverse effects of the vowel recognition in the vowel sequence recognition unit 307.

In this case, the rank is attached to a plurality of vowel sequence candidates of unknown input 311 and a weight is added in accordance with the order upon DP matching, thereby providing a more appropriate matching.

By replacing rough classification unit 306 of FIG. 3 by point accumulating unit 106 and recognition result candidate output unit 107 as shown in FIG. 1 of the first principle of this invention, a still higher-speed recognition process can be executed.

The Explanation of the First Embodiment

The explanation of the first embodiment based on the first and second principles described before is explained.

The Whole Structure of the First Embodiment

Figure 4:
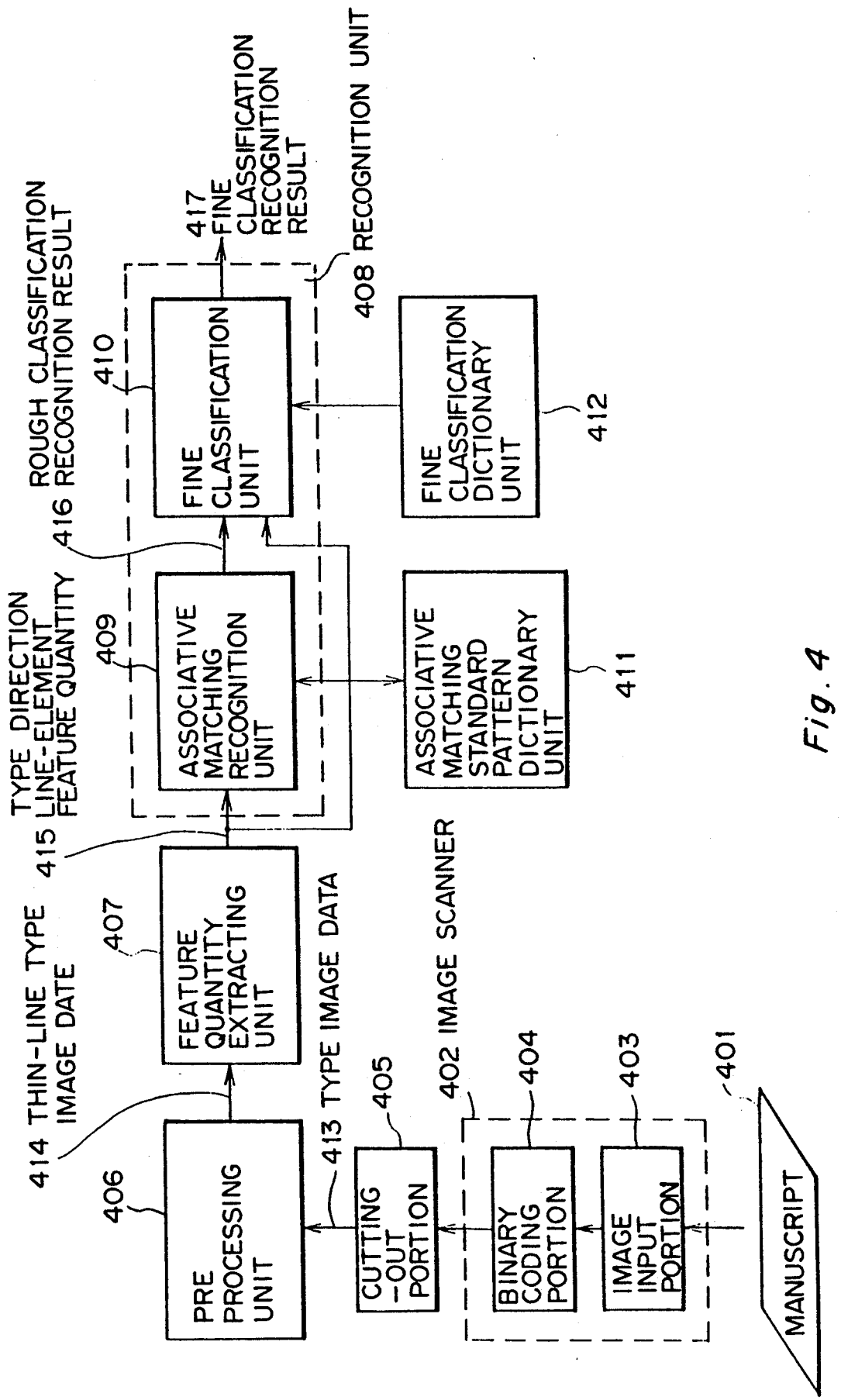
FIG. 4 shows the structure of the first embodiment of the present invention.

FIG. 4 shows the whole structure of the first embodiment of the present invention.

Manuscript 401 on which a typed document is printed is read out by image input portion 403 within image scanner 402 (the resolution is eight lines per millimeter) and thereafter is converted to binary image data expressed by a logic "1" or "0" in binary coding portion 404.

Next, the binary image data is input to cutting-out portion 405. Respective types are cut out from the binary image data in units of 64 dots horizontally by 64 dots vertically, per character. The logic "1" or "0" of one-bit data expresses whether or not a pattern is represented by respective dots. Type image data 413 cut out in such a manner is input to preprocessing unit 406. A noise removing and smoothing process is applied to type image data 413 and then the size of the type image data is subjected to a normalization. Thereafter, the pattern is subjected to a thin-line process for obtaining the directional component of respective dots. This process is conducted for the data subjected to a thin-line process, thereby outputting thin-line character image data 414. Thin-line type image data 414 output from preprocessing unit 416 in accordance with the above processing is input to feature quantity extracting unit 407. Based on thin-line type image data 414, a type direction thin-line feature quantity 415 is calculated as a feature quantity of the type.

Type direction original line feature quantity 415 is input sequentially to an associative matching recognition unit 409 within a recognition unit 408. A pattern matching is carried out in recognition unit 408 between a type direction line element feature quantity and a standard pattern for an associative matching stored in associative matching standard pattern dictionary unit 411, using an associative matching method. A type candidate of the original type image data 413 is recognized and output as a rough classification result 416.

Further, the rough classification result 416 thus recognized is input to fine classification unit 410, in which fine classification dictionary unit 412 is referred to, based on the type candidate obtained as rough classification result 416. By using the fine classification dictionary unit 412 and the original type direction line element feature quantity 415, a fine classification is carried out and the final type recognition result is output as fine classification result 417.

Explanation of an Operation of the First Embodiment

The operation of the embodiment of the above structure is explained sequentially hereinafter.

The following explanation will be made based on a flowchart of the whole operation of the first embodiment, shown in FIG. 5.

Image Input Process

The process for obtaining type image data 413 image input processing will be explained.

In FIG. 4, manuscript 401, on which a typed document is printed, is read by image input unit 403. It is converted to binary image data in binary unit 404 (FIG. 5, S15). Further, in cutting out unit 405, the respective types are cut out from the binary image data in units of 64 dots horizontally by 64 dots vertically per character and is output as type image data 413 (FIG. 3 S16). An example of the type image data 413 is shown in FIG. 6, using a chinese character 「訓」. In FIG. 6, the dots represented by "*" are expressed by logic "1" as a pattern portion.

Noise Removal, Symbol Classification Determination, and Smoothing Processing

Type image data 413 cut out in the above process are input to preprocessing unit 406 in FIG. 4 and subjected to a noise removal. Type image data 413 sometimes include a noise due to manuscript 401 itself and to poor reading accuracy of image scanner 402. The noise appears as a point of 1 to 2 dots which are isolated on the image. This adversely affects the following recognition process. Such noise can be removed by a logical process, such as a noise removing process (FIG. 5, S17).

The type image data from which noise is removed is subjected to a determination to determine the symbol they represent in preprocessing unit 406. As described later, the size of the type image data is normalized and is made to be a thin-line. When some characters are subjected to a normalization or thin-line processing, the data of the original character is lost. An example is shown in the following, Case ①:
A type which is not suitable for normalization and thin-line processing
Example . . . . ･ ´ ` ˜ ˙ ` ´ ` ˇ ∕

If a symbol as recited above is normalized and subjected to a thin-line processing, the original shape is lost.

Case ②:
A character which is <u>not</u> suitable for a normalization
Example ﹁ ¯ ＿ ﹂

If a type as stated above is normalized, the whole region becomes black.

Case ③:
A type which is not suitable for thin-line processing.
Example 〔 〕 ★ ● ◆ ■ ▲ ▼ ＝

If a type as recited above is subjected to a thin-line processing, it will become a point or a short line.

Figure 5:
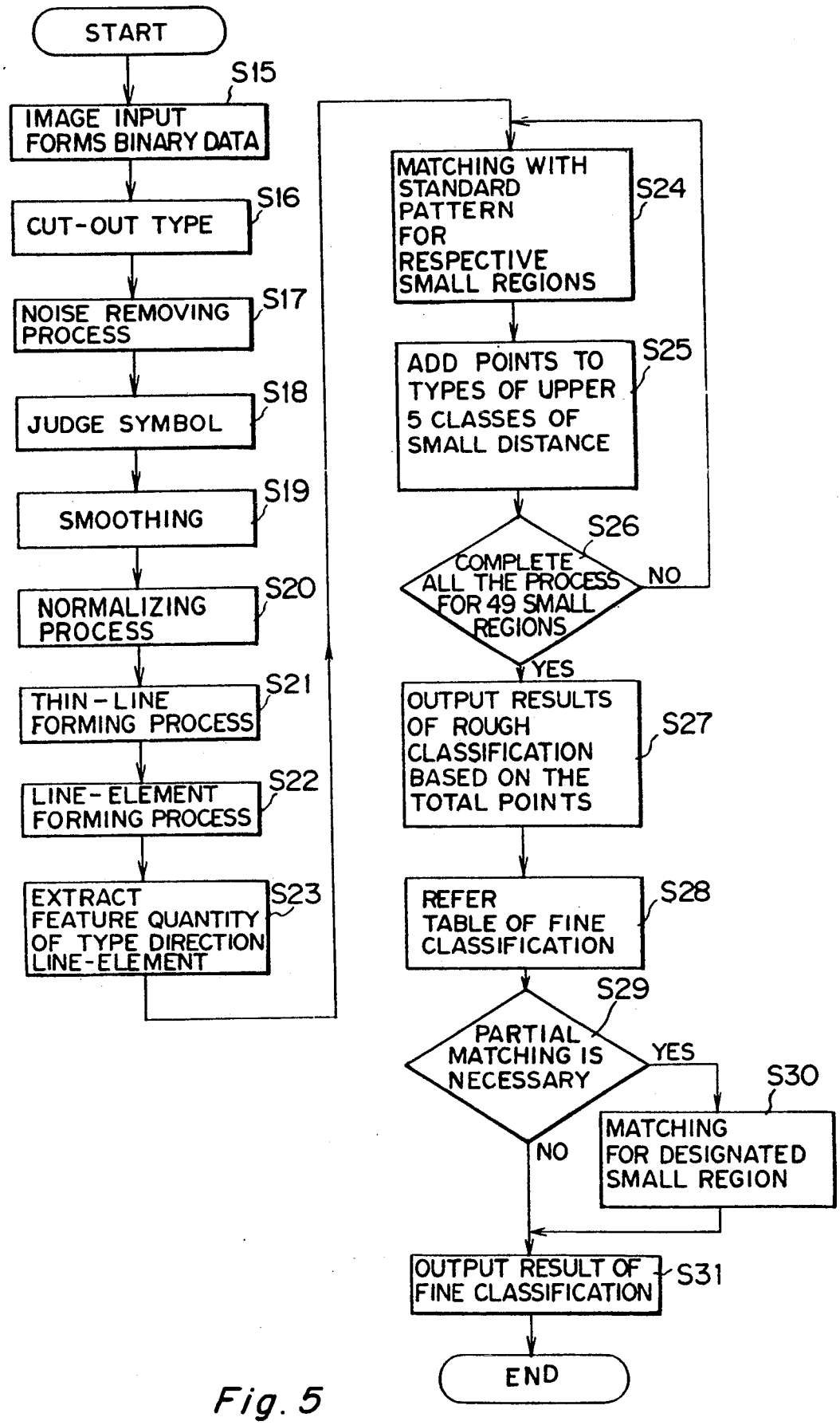
FIG. 5 is a flowchart showing the operation of the first embodiment.
Figure 6:
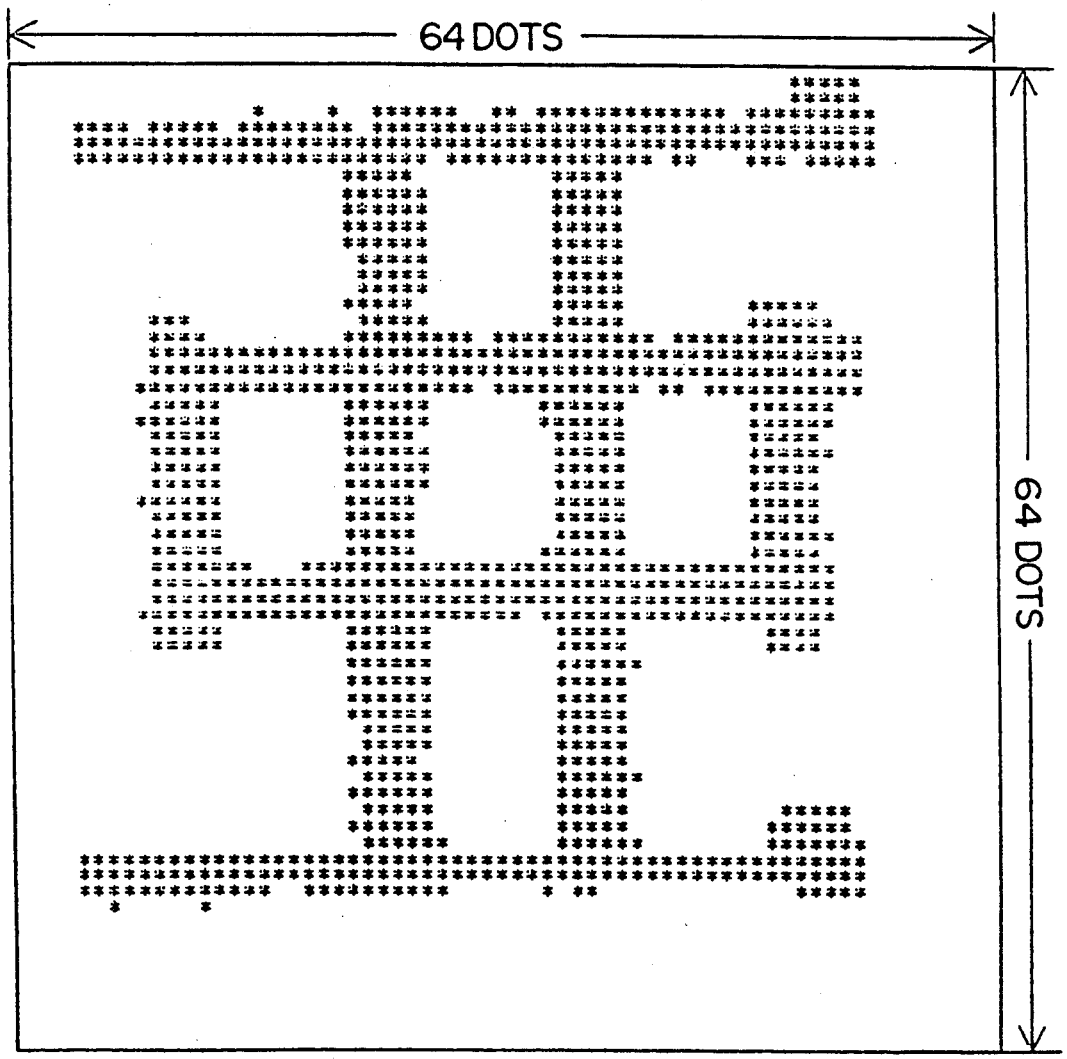
FIG. 6 shows an example of a pattern of type image data.

For the characters described above, ordinary normalization and thin-line processing described later is not conducted and other processing may be applied to them, resulting in a correct recognition and enabling the symbol to be determined after the noise removing process is conducted (FIG. 5,S-18). The determination algorithm is described as follows.

The character corresponding to case ① is several times smaller than the ordinary character and is determined based on the width of the smaller character.

The horizontal and vertical dimensions of the type corresponding to case ② differ, and the type is determined based on the ratio of these dimensions.

Finally, the types corresponding to case ③ have the repetition frequency of the thin-lining processing (described hereinafter), which is several times more than the repetition frequency of the thin-line processing of the ordinary type, although the repetition frequency of the thin-line processing of an ordinary character corresponds to about one half the width of the line. It is determined in the later-described thin-line processing by providing an appropriate threshold value.

Figure 7:
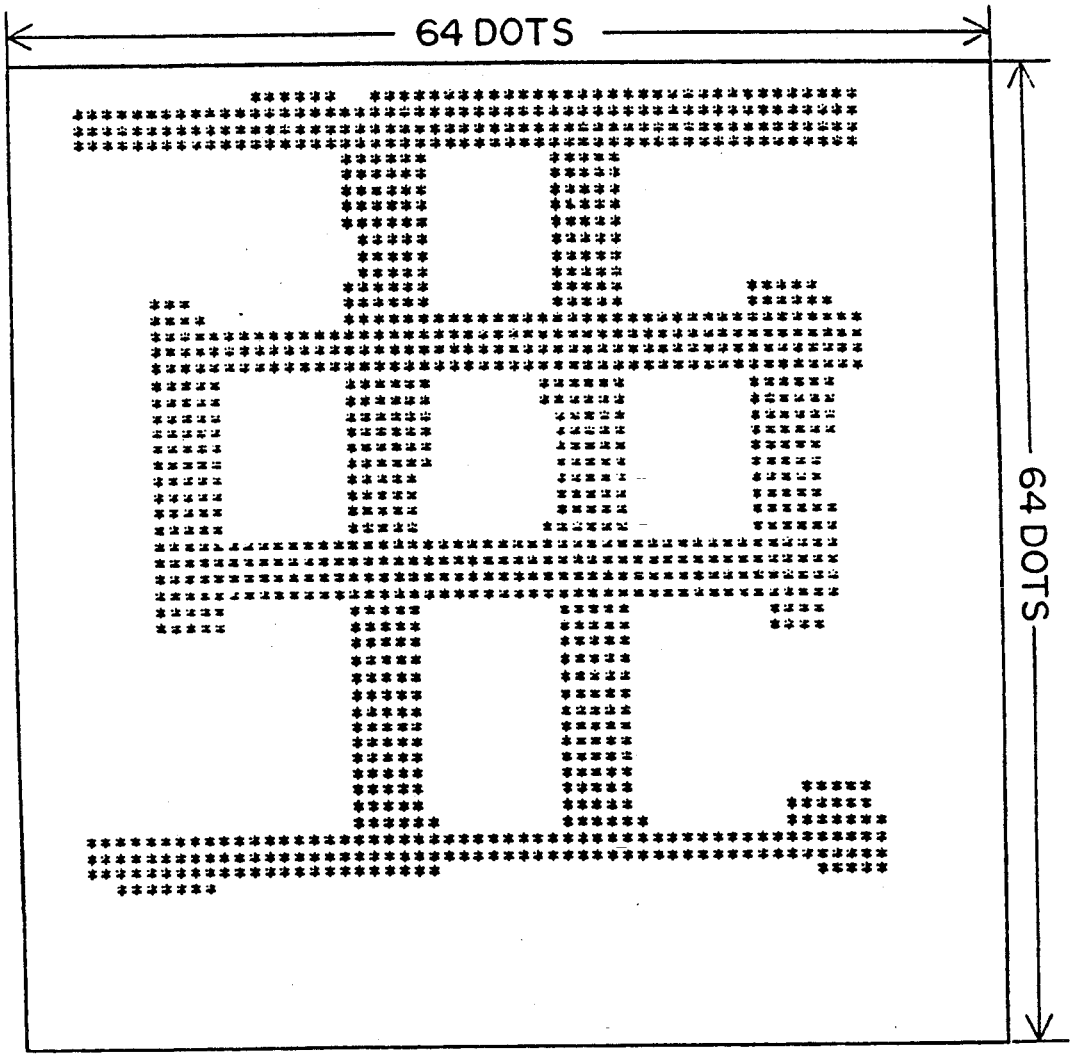
FIG. 7 shows an example of a pattern of type image data after noise reduction and smoothing.

After determination of the above symbols, characters, etc., a smoothing process is applied to types which are not determined to be these symbols and characters. Irregular portions often occur on lines of type in addition to the noise with regard to the type image data 413. When manuscript 401 of FIG. 4 is printed by a dot printer, irregular portions appear on the manuscript 401 itself and the reading accuracy of image scanner 402 also constitutes one of the reasons. Such a portion of the line adversely effects the following recognition practices and smoothing is conducted in the processing unit 406 in FIG. 4. (FIG. 5, S19). More particularly, local masked processing (about 8 adjacent dots) detects a recess or projection of about 1 dot, and performs a process of filling the recessed portion or deleting the projecting portion. The process is a digital image processing and thus a detailed explanation is omitted. The result obtained after the above smoothing process is applied to type image data 413 in FIG. 6, is shown in FIG. 7. As shown in FIG. 7, a local recess and projection of the line, which is observed in FIG. 6, is smoothed.

Normalization Process

The type image data subjected to noise removal and smoothing is again subjected to normalization in preprocessing unit 406 in FIG. 4. The printed character (the character of the Japanese word processor) generally consists of a whole angular, double angular, of half-angular character, and the size of the character varies. Characters of the same angle differ in size depending on the design of the maker. The first embodiment performs a normalization of the input image data to remove the influence of the size of the type (FIG. 5, S20).

A linear expansion and compression method is used for performing a normalization process. A linear expansion and compression is conducted to provide a size of 64×64 dots The type is determined to be a case ① by the "previously recited process of determining a symbol", and the type image data is linearly enlarged to provide a size of 20×20 dots. Then, the later-described thin-line process is not carried out, but is directly transmitted to the later-described line-element-forming unit. The vertical and horizontal dimensions of the character determined to be case ② is expanded in proportion to the respective dimensions of the characters.

Figure 8:
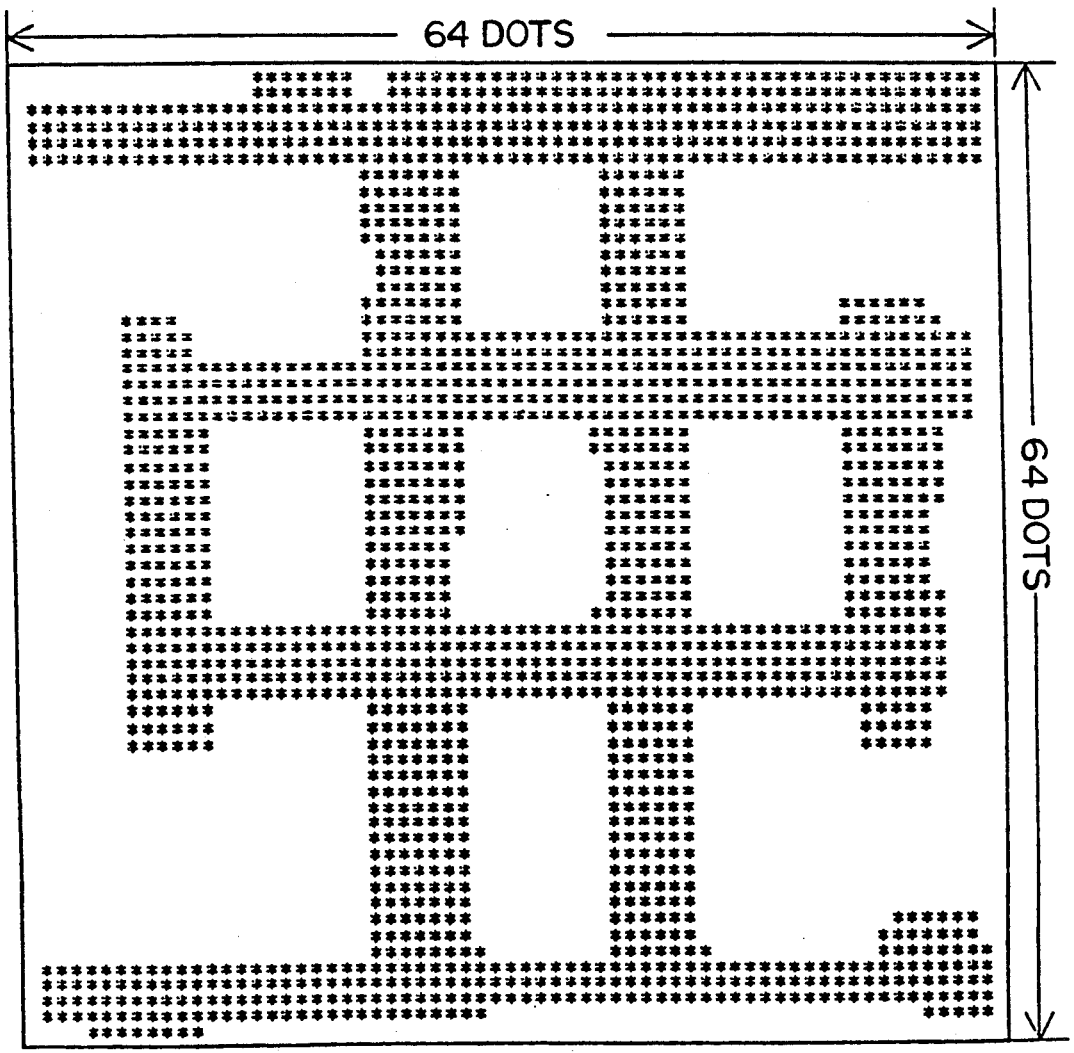
FIG. 8 shows an example of type image data after normalizing.

FIG. 8 shows an example in which a normalization process is applied to the type image data after the noise removal and smoothing shown in FIG. 7.

Thin-Line Forming Process

The thin-line-forming process is applied to the type image data normalized as recited above, in preprocessing unit 406 of FIG. 4 (FIG. 5, S21). Thin-line-forming process means that the width of the line (pattern portion) is condensed to one dot to enable the pattern portion to be expressed by a single line. There are various prior arts of the method for forming a thin-line. In this embodiment, a logic mask of 3×3 dots is enabled to scan the character image data and the dots on which the pattern exist are deleted with an interconnection relation of 8 adjacent dots surrounding a central dot of the observed mask.

The symbols belonging to case ③ of the "symbol determining process" are determined here as recited above. For the symbols determined to be case ③ the process of forming a thin-line is immediately stopped and the later-described line-element-forming process is carried out in the state before the thin-line-forming is carried out.

Figure 9:
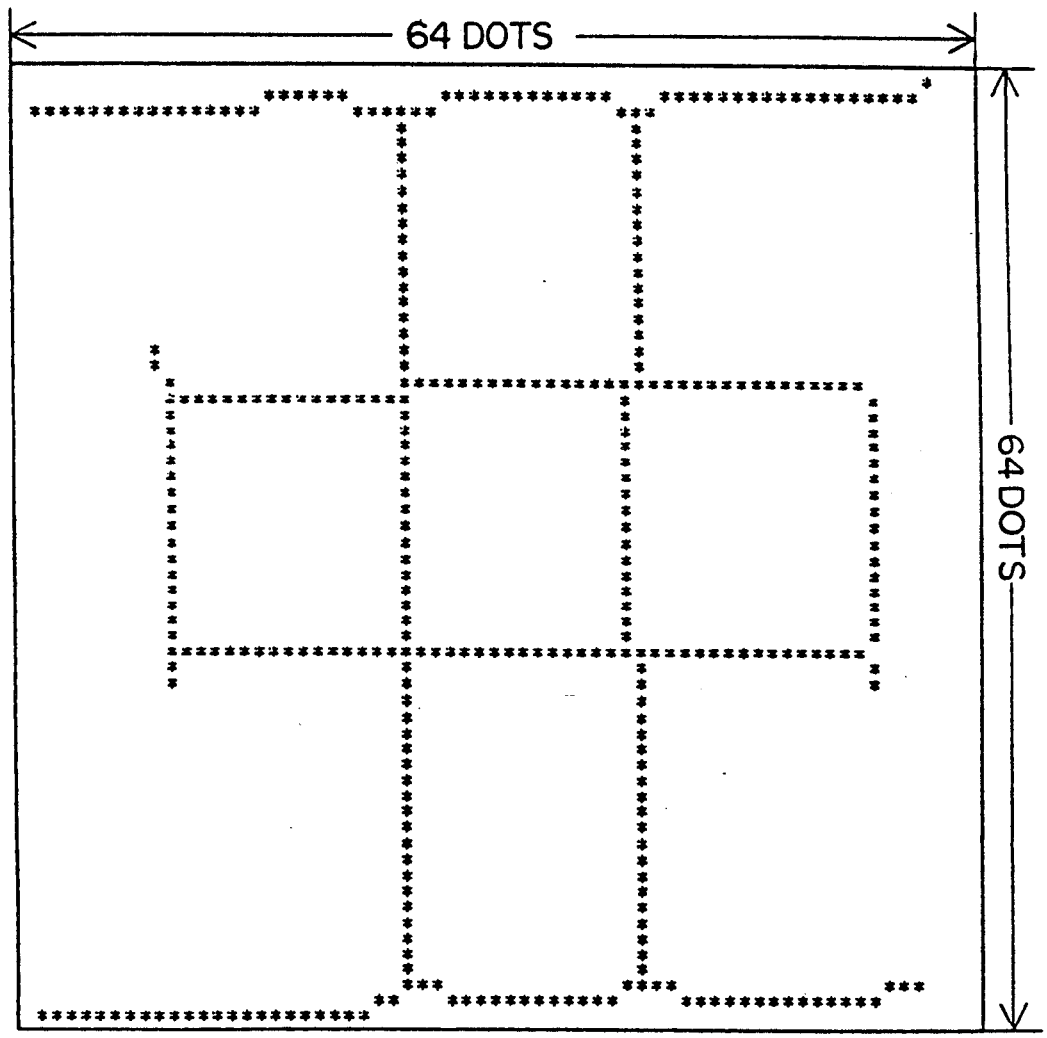
FIG. 9 shows an example of type image data after thin-line processing.
Figure 10:
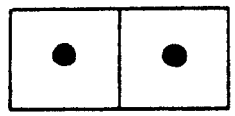
FIGS. 10A to 10D show masks for extracting the direction component.
Figure 10:
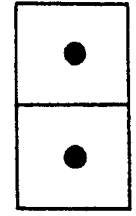
Figure 10:
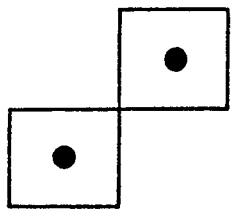
Figure 10:
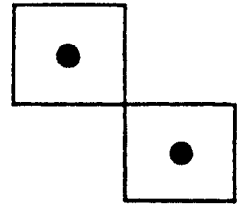

The example in which the thin-line-forming process is applied to the type image data after the normalization of FIG. 8, is shown in FIG. 9.

Line-Element Forming Process

The line-element-forming process to be conducted before the later-described feature-quantity extraction is applied to the type image data which has been subjected to the thin-line formation, as shown in the first embodiment (FIG. 5, S22). Line-element-forming processing means that respective dots of the thin-line forming pattern is expressed by a component in one direction selected from four direction components comprising ① horizontal component, ② vertical component, ③ 45 degree component and ④ 135 degree component.

In order to extract a direction component, four logical masks of 2×1 dots corresponding to four directions are used as shown in FIGS. 10A to 10D and are used corresponding to four directions. The mask scans every dot on the screen and it is determined whether two dots of respective masks are totally buried by the pattern (a bit of logic "1"). If the whole mask is buried by the pattern, the direction of the mask at this time is stored as the direction component of the dot.

The above algorithm is not useful for dots of an isolated point or multi-directional points, and the direction of the dots in these cases is determined by using a logic mask of 3×3 dots, and is based on which is the majority.

For symbols determined to be case ① or case ③ by the "symbol determination process", the direction component of 135° is uniformly applied to all the pattern dot portions of type to be distinguished from the other types.

The line element formed from one character of the type and obtained by the above process is output as line element character image data 414.

Figure 11:
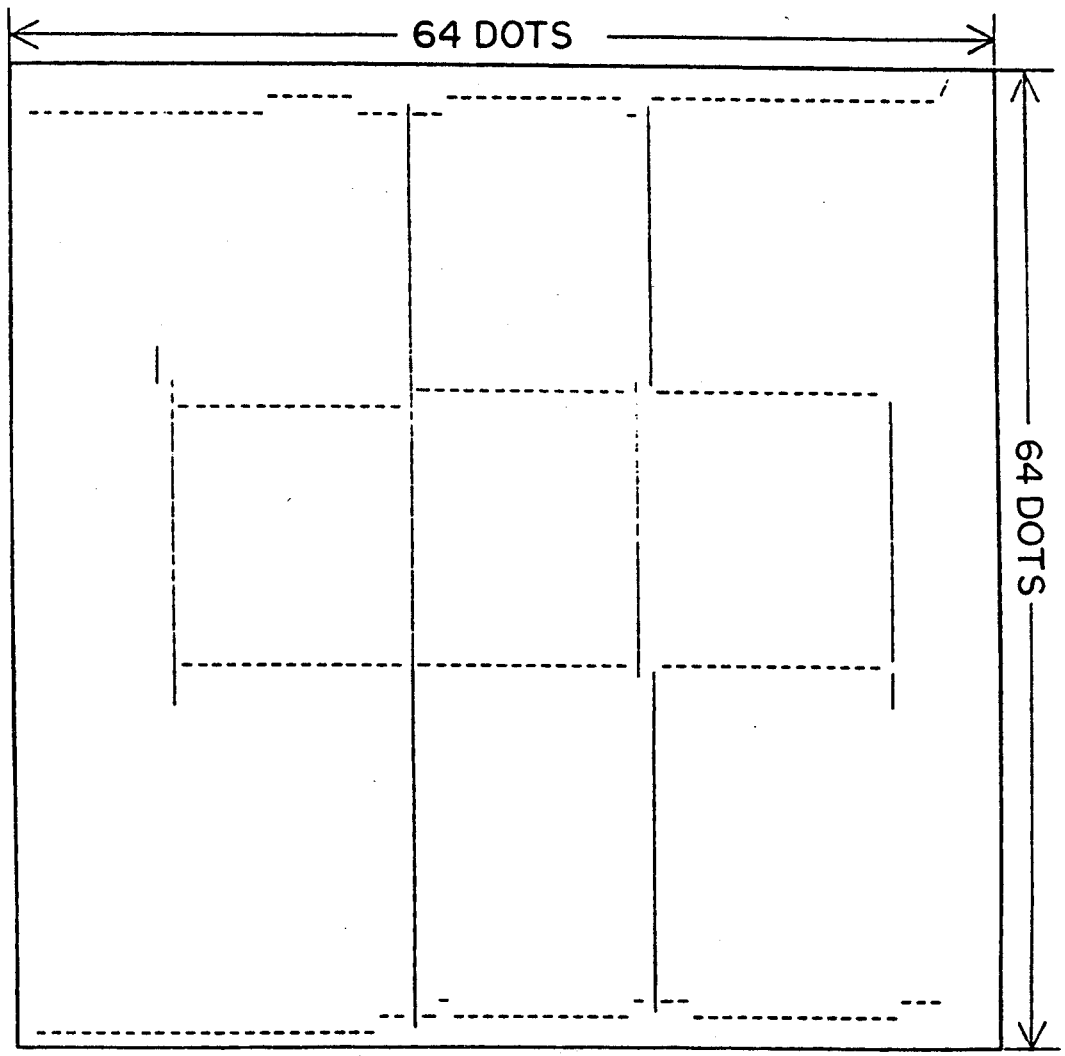
FIG. 11 shows an example of thin-line type image data.

FIG. 11 shows the embodiment for expressing, as an image, respective dots to which the direction component is assigned with regard to line element character image data 414. The dots are obtained by applying the above line-element-forming-process to the character image data after a thin-line-processing.

Extraction Process of a Feature Quantity of the Character Direction Line Element Line element character image data 414 output from preprocessing unit 406 of FIG. 4 is input to feature quantity extracting portion 407. Character direction line element feature quantity 415, constituting a fundamental of a recognition operation in this embodiment, is extracted.

Figure 12:
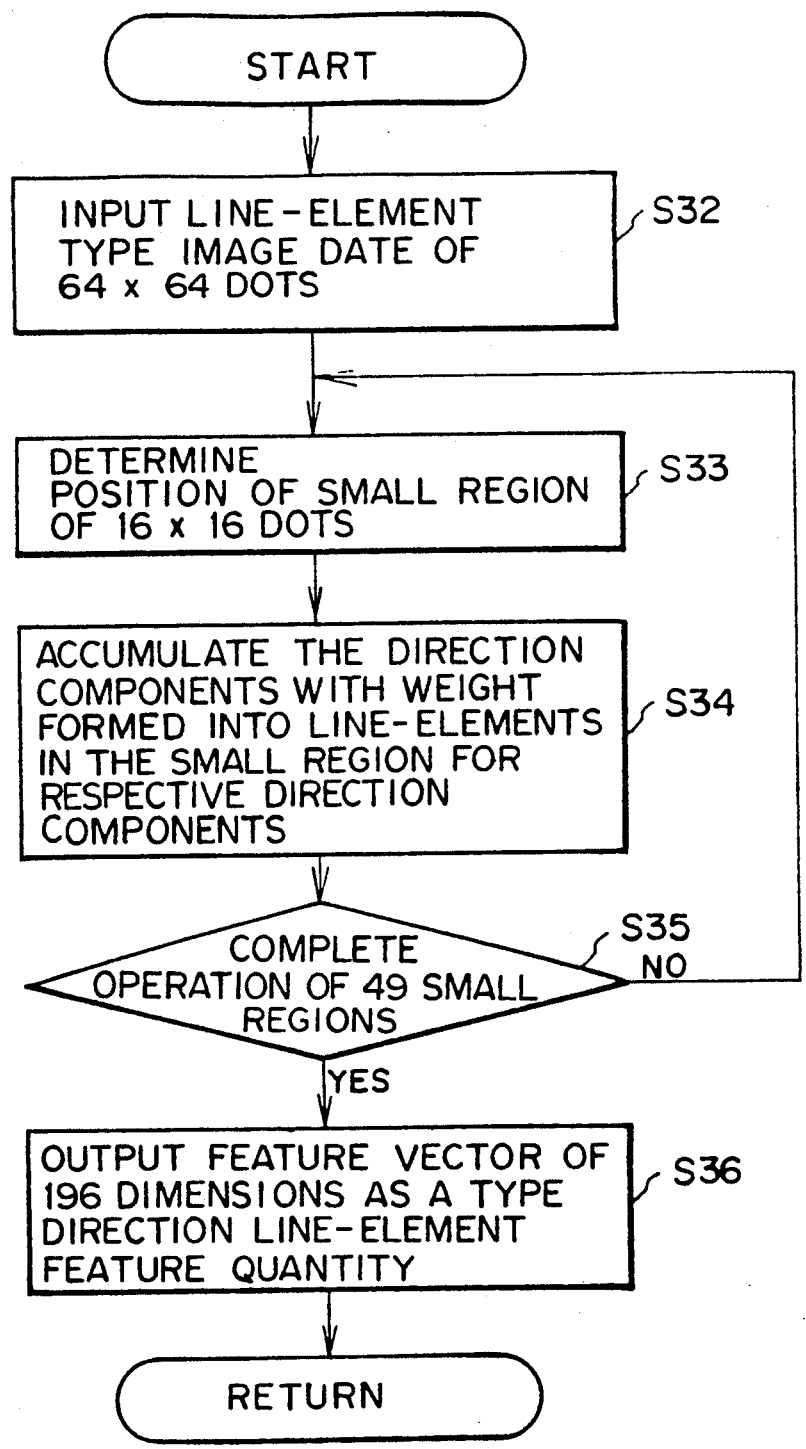
FIG. 12 shows an operational flowchart of the operation for extracting the type direction line element feature quantity.

The operation in this embodiment corresponds to S23 of FIG. 5 and this portion is shown in more detail in the operation flowchart of FIG. 12.

Line element character image data 414 of 64×65 dots output from the preprocessing unit 406 of FIG. 4 is input (FIG. 12, S32).

Figure 13A:
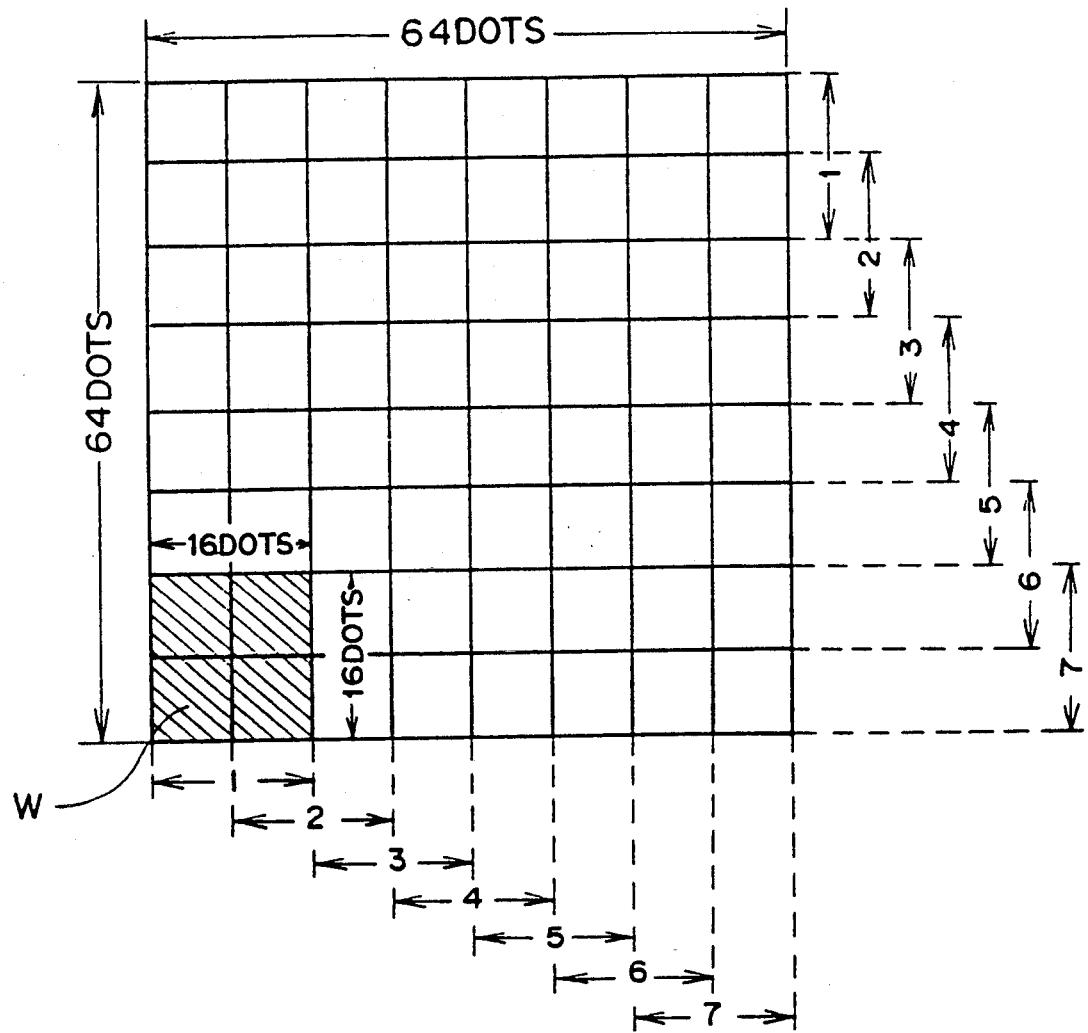
FIG. 13A shows a relationship between the line element processing type image data and the small regions, FIG. 13B explains the weighting of the small regions.

Next, a location of a small region of 16×16 dots is determined for the data (FIG. 12, S33). First, line element character image data 414 of 64×64 dots is divided vertically and horizontally at intervals of 8 dots, as shown in FIG. 13A. A small region W, namely, a unit region comprising 16×16 dots, is considered. The small region W is moved vertically and horizontally at intervals of 8 dots, namely, by overlapping the small region of half a mask, thereby producing seven vertical or horizontal small regions, as shown in FIG. 13A. Finally, for line element character image data 414 of 64×64 dots, 7×7=49 position designations of the small regions W can be designated. The designation of the position of these 49 small regions is shifted rightward at intervals of 8 dots starting from the upper left portion of FIG. 13A, and is returned leftward when it reaches the right side. The 8 dots are then moved downward, thereby designating a location of the small region W. This process is repeated from S35 to S33, as shown in FIG. 12.

When the location of the small region W is determined by the above process, the direction component of the dots subjected to a line element formation in the above recited line element forming process is accumulated by providing a weight for respective direction components (FIG. 12, S34).

Figure 13B:
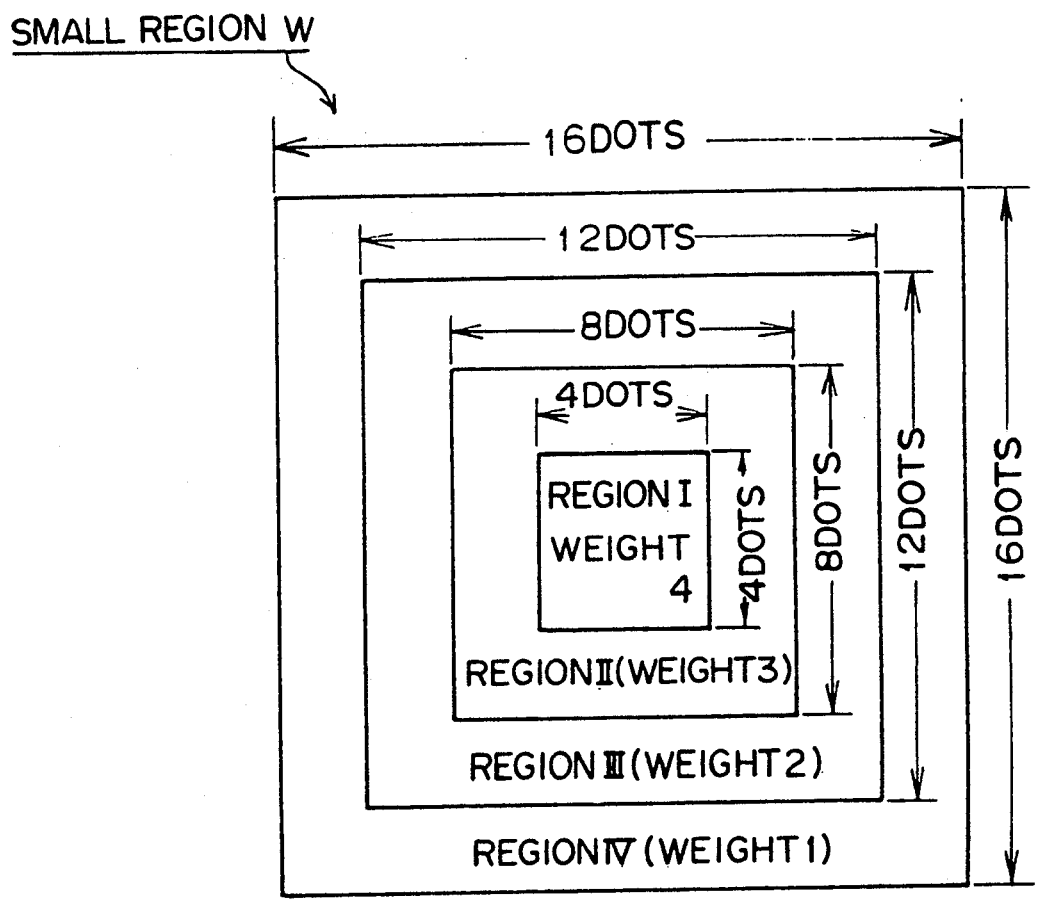

As shown in FIG. 13B, in a small region W of 16×16 dots, a weight 4 is assigned to a region I surrounded by a frame of 4×4 dots at the center, a weight 3 is assigned to a region II surrounded by the region I and a frame of 8×8 dots around the region I, a weight 2 is assigned to the region III surrounded by the region II and a frame of 12×12 dots around the region II, and a weight 1 is assigned to the uppermost outside circle and provided outside the region III. In the process S33 in FIG. 12, the number of dots to which the direction component is assigned in a small region W comprising 16×16 dots and the position of 64×64 dots which is determined in line element image data 414 is accumulated for respective directional components. The corresponding weight is multiplied for an accumulation depending on the region in which respective dots are located. Namely, the value of the dot to which a direction component is assigned is determined to be "1" with regard to a direct region in which the dot exists, thereby providing the product which is accumulated for respective dots.

Figure 14:
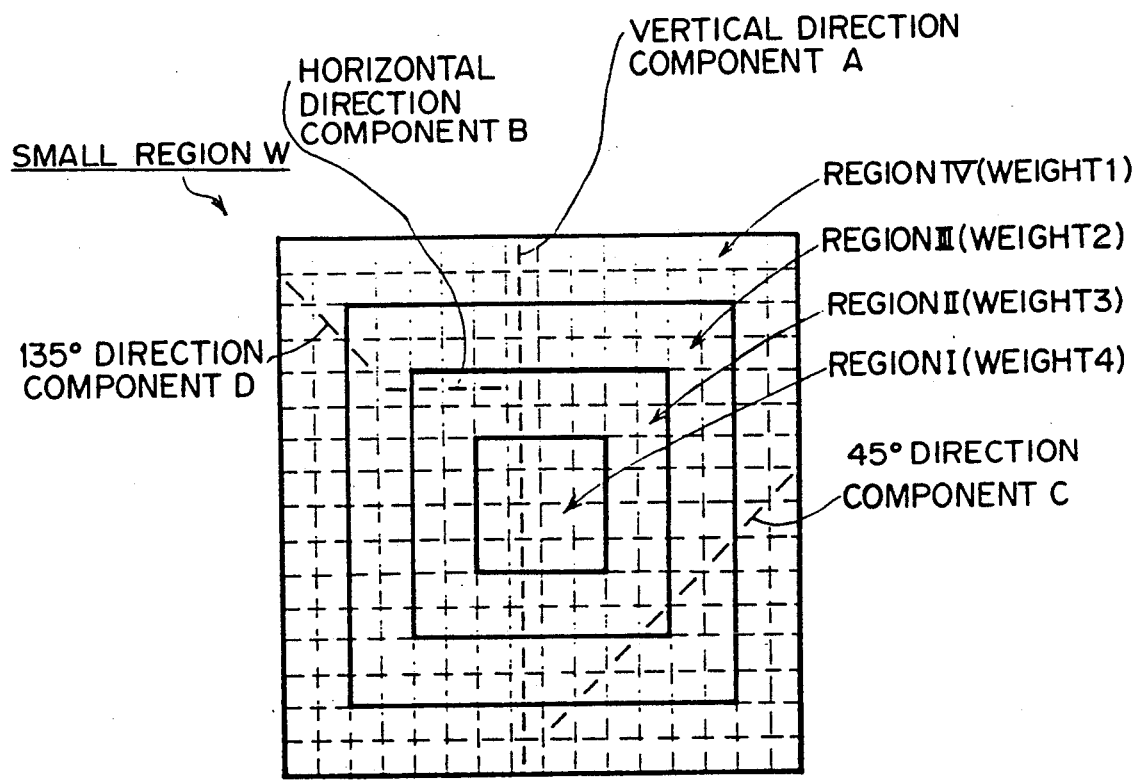
FIG. 14 shows an example of a calculation of the type direction line element feature quantity.

As an example of a calculation of the above process, line element (dots) A to D having four direction components, vertical, horizontal, 45-degree and 135-degree, are provided in the small region W as shown in FIG. 14. In the drawing, line element A, which has a vertical direction component, includes four dots in regions I, II, III and IV. Thus, the accumulative weight is $$4 \times 4 + 3 \times 4 + 2 \times 4 + 1 \times 4 = 40 \tag{1}$$

A line element B, which has a horizontal direction component, comprises three dots in region II (weight 3) and a dot in region III (weight 2). Thus, the accumulative weight is $$3 \times 3 + 1 \times 2 = 11 \tag{2}$$

Further, a line element C, which has a 45-degree direction component, has one dot in region II (weight 3), four dots in region III (weight 2) and three dots in region IV (weight 1). Therefore, the accumulative weight is $$3 \times 1 + 2 \times 4 + 1 \times 3 = 14 \tag{3}$$

Line element D, which has a 135-degree direction component, has one dot in region III (weight 2) and two dots in region IV (weight 1). Therefore, the accumulative weight is $$2\times1+1\times2=4 \qquad (4)$$

The accumulative weights in the four direction components: vertical, horizontal, 45-degree and 135-degree, are assigned to four valuable numbers V1, V2, V3 and V4 and the vector shown by (V1, V2, V3, V4) is defined as a partial feature vector in the present small region position. Namely, a partial feature vector in the above embodiment (FIG. 14) are (40, 11, 14, 4) according to equations (1) to (4). Therefore, a partial feature vector of four dimensions can be obtained for a single small region position.

The process of obtaining partial feature vectors of four dimensions is carried out for respective positions determined by shifting a small region W of $16\times16$ dots at intervals of 8 dots (FIG. 12, S35 S33). A possible number of positions of a small region can be designated in line element type image data 414 of $64\times64$ dots. When a process of 49 small regions is completed, a feature vector of $4\times49=196$ dimensions can be obtained. A partial feature vector of four successive dimensions precisely corresponds to a position of 49 small regions.

A feature vector of 196 dimensions is output from feature quantity extraction unit 407 in FIG. 4 as type directional line element feature quantity 415 corresponding to type image data 413 of FIG. 4, and a process of extracting a type direction line element feature quantity is completed (FIG. 12, S35→S36).

Feature of a Method for Extracting the Type Direction Line Element Feature Quantity An advantage of a method of extracting a feature quantity of the type direction line element, shown as the processes from S15 to S23 in FIG. 5, is briefly summarized. A normalization and a thin-line formation in the preprocessing step avoids the influence of the size of the type pattern and the thickness of the line. As the type pattern is treated as a line, it is not limited to characters.

Next, a line element of the type image data subjected to a thin-line formation is prepared in four directions. This enables the structure of the pattern to be normalized, thus facilitating stable extraction of the feature quantity in the following stage.

49 pairs of partial feature vectors each comprising four dimensions expresses a partial feature, namely, partial information about 49 parts corresponding to respective positions of small regions in the type pattern represented by type image data 413 of FIG. 4. The 49 pairs of partial feature vectors are formed from the feature vectors of 196 dimensions obtained as type direction line element feature quantity 415. Therefore, in the Chinese character pattern, data corresponding to a partial pattern comprising a component of the Chinese character can be obtained without requiring a recognition of these patterns and without using a complicated algorithm.

In this case, by using a weighted small region W, the position and direction of a line is clearly reflected by the type direction line element feature quantity 415. The weight is made light for a line near a boundary of the small region W and the contribution ratio of the boundary of the small region in extracting the partial feature vector at the position of the small region is made lower. Thus, an appropriate process for a stable line having a high possibility of entering into an adjacent small region position can be conducted.

Namely, a line positioned near the boundary of the small region W is possibly not included in the small region W even if its position is shifted slightly in accordance with the status of the image input. Therefore, if the partial feature vector is calculated by adding the same weight to the line near the boundary as that of the line at the center of the small region, the partial feature vector changes greatly depending on whether or not the line near the boundary is included in the small region W. Therefore, by adding a smaller weight to the line near the boundary, the feature vector cannot be changed greatly whether or not the line near the boundary is included in the small region W when the input image is shifted to some extent. Thus, it becomes possible to extract the partial feature vector in a stable manner.

By overlapping a half portion of a small region with a half portion of its adjacent small region the line located near the boundary of the adjacent small region can be moved to the center of the present small region. Therefore, the line provided at the center of the small region can produce an appropriate partial feature vector.

As described above, type direction line element feature quantity 215 can be stably extracted by using a weight which is similar to that of any type pattern. For example, a complicated Japanese pattern having many short strokes can be adequately processed.

By paying attention to a partial feature vector at an appropriate small region position, partial information of only a portion of the type can be extracted, thereby facilitating a fine classification recognition processing. This is recited later.

Associative Matching Standard Pattern Forming Process

A process for recognizing type image data 413 (FIG. 4) using an associative matching method based on the type direction line element feature quantity 415 obtained as recited above will be explained as follows.

When a recognition process is conducted using the later-described associative-matching method, it is necessary to register the associative-matching standard pattern in associative-matching standard-pattern dictionary 411 shown in FIG. 4. Before the process for recognizing type image data 413 (FIG. 4) this method is explained, the process of forming the standard pattern is explained. This process is shown in the operation flowchart in FIG. 15.

Figure 15:
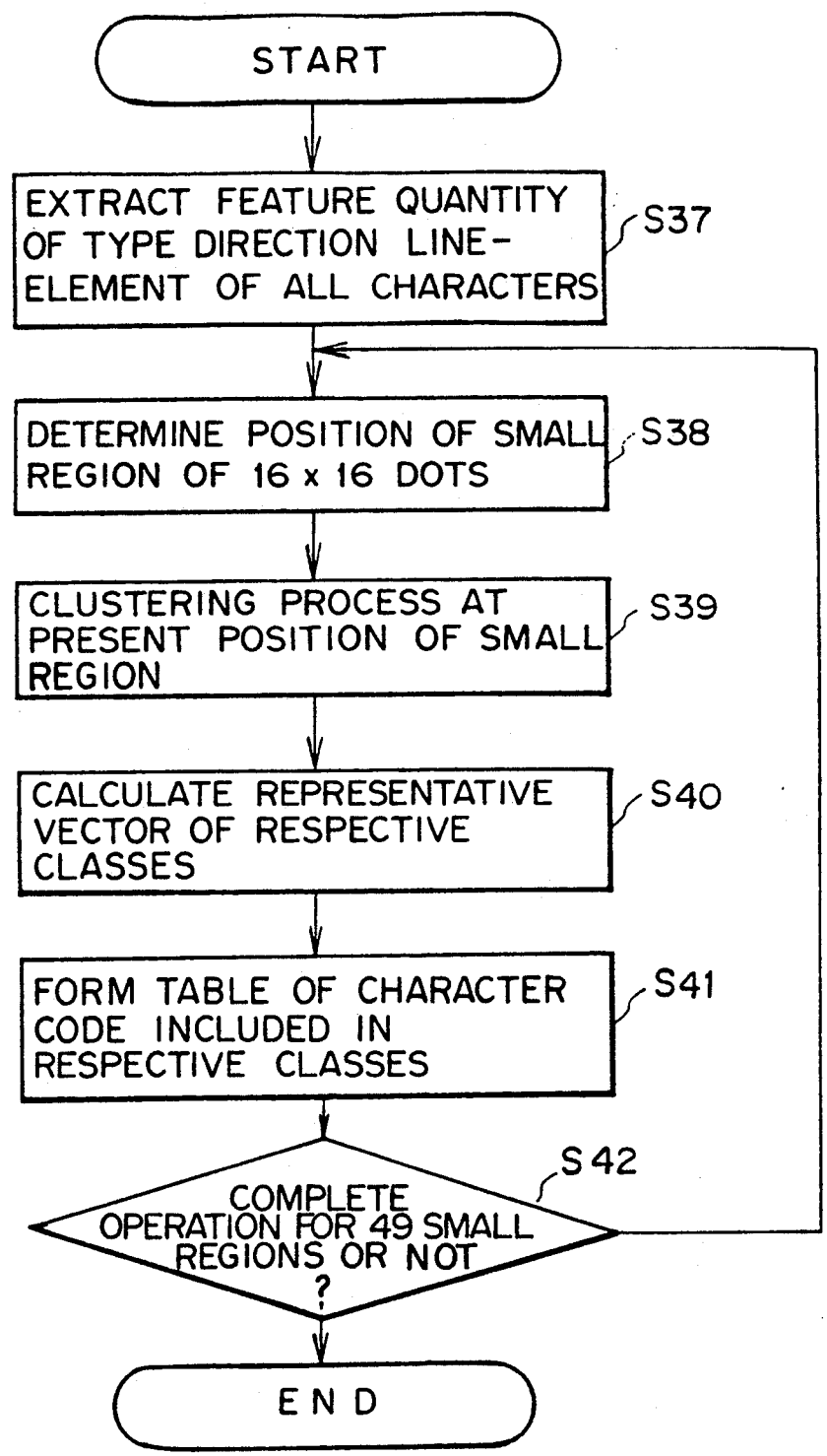
FIG. 15 is an operational flowchart showing the associative matching standard pattern forming process, FIG. 16 explains the clustering operation.

For all the characters, namely, about 3003 characters of type image data 413 of Japanese, the type direction line element feature quantity is obtained by a process similar to that of the type direction line element feature quantity extraction (FIG. 15, S37). Suppose that the number of the kinds of character is N and the type direction line element feature quantities of various characters, namely, the feature vectors of 196 dimensions, is expressed as $X_i$ (i=1 to N), and respective $X_i$ are composed of 49 pairs of partial feature vectors $X^{(m)}_i$ (m=1 to 49), each pair corresponding to 49 positions of respective small regions and comprising four dimensions as explained in FIG. 13A. The meaning of respective dimensions has been explained already.

The process of forming a standard pattern which should be conducted later is as follows. The feature vectors $X_i$ (i=1 to N) of all the characters are subjected to a clustering process with regard to respective positions of the small region, and are classified into the following L classes (normally, about 20).

$$C^{(m)}_1, C^{(m)}_2, \ldots C^{(m)}_L \quad (m=1\sim 49)$$

With regard to the positions of respective small regions, the representative vectors, $\overline{X}^{(m)}_i$ of four dimensions are calculated from the respective classes, as follows.

$$\overline{x}_i^{(m)} = E(x^{(m)}), \; x^{(m)} \in C_i^{(m)} \quad (5)$$
$$(i = 1\sim L, \; m = 1\sim 49)$$

Representative vectors $\overline{X}^{(m)}_i$ obtained by calculating (the process shown by $E(X^{(m)})$ in the above) the average vector of the partial feature vectors $X^{(m)}$ corresponding to the characters included in the respective classes of the respective small region positions and the representative vectors $\overline{X}^{(m)}_i$ is deemed a standard pattern. The algorithm for conducting the above process is described as follows.

(a) First, a position m of a small region of 16×16 dots as explained in FIG. 13A is determined (FIG. 15 S38).

(b) The partial feature vectors $X^{(m)}_i$ (i=1 to N) of four dimensions of all the characters corresponding to the small region position m are clustered and classified into L classes $C^{(m)}_i$ (i=1 to L) by using a clustering algorithm of the furthest neighbor algorithm shown in the following ①  to ③.

① $C^{(m)}_i = \{X^{(m)}_i\}$, (i=1~N)
count=N

These are classified into N classes as initial values and each class is composed of a partial feature vector $X^{(m)}_i$. The count means a variable number representing the number of divided classes and clustering is completed when a count equal to L is achieved, as described later.

② Find $C^{(m)}_i{}'$, $C^{(m)}_j{}'$ satisfying the following equation.

$$d(C^{(m)}_i, C^{(m)}_j) = m_{i} i_{j} n \{d(C^{(m)}_i, C^{(m)}_j)\}$$

where $$d(C_i^{(m)}, C_j^{(m)}) = \max \{\|x_p^{(m)} - x_q^{(m)}\|\}$$
$$(x_p^{(m)} \in C_i^{(m)}, \; x_q^{(m)} \in C_j^{(m)})$$

Here, $|X^{(m)}_p - X^{(m)}_q|$ represents the distance between two vectors $X^{(m)}_p$ and $X^{(m)}_q$ and is calculated as the sum of the euclidean distance of the four-dimensional feature vector. Namely, $$\|x_p^{(m)} - x_q^{(m)}\| = \sum_{k=1}^{4} (x_{p,k}^{(m)} - x_{q,k}^{(m)})^2$$

where $X^{(m)}_{pk}$ and $X^{(m)}_{qk}$ represent an element of respective dimensions of the respective partial feature vectors $X^{(m)}_p$ and $X^{(m)}_q$.

③. $C^{(m)}{}'_i$, $C^{(m)}{}'_j$ are combined. Namely, $$C^{(m)}{}'_i = C^{(m)}{}'_i + C^{(m)}{}'_j$$

where "+" denotes to take a union of two sets $C^{(m)}{}'_i$ and $C^{(m)}{}'_j$.

④. count=count−1

⑤. If the count is not equal to L, ② to ④ is repeated and if the count is equal to L, the clustering process is completed.

The partial feature vector $X^{(m)}_i$ (i=1 to N) of four dimensions of the N characters corresponding to the present small region position m is classified into L classes (FIG. 15, S 39) by the above recited clustering algorithm.

(c) The representative vector $\overline{X}^{(m)}_i$ of L classes corresponding to the position m of the small region as described above is calculated (FIG. 15 S40). This is calculated as an average of the partial feature vector $X^{(m)}$ of four dimensions corresponding to the characters included in respective classes $C^{(m)}_i$ (i=1 to L) as shown by equation (5), and the number of dimensions is naturally four.

(d) When the above process is completed, a dictionary is formed by forming a table for codes or labels which represent the kinds of respective characters included in respective classes $C^{(m)}_i$ (i=1 to L), (FIG. 15, S41).

The above process comprising steps (a) to (d) is applied to respective positions m (m=1 to 49) of 49 small regions (FIG. 15 S42→S38).

Figure 16:
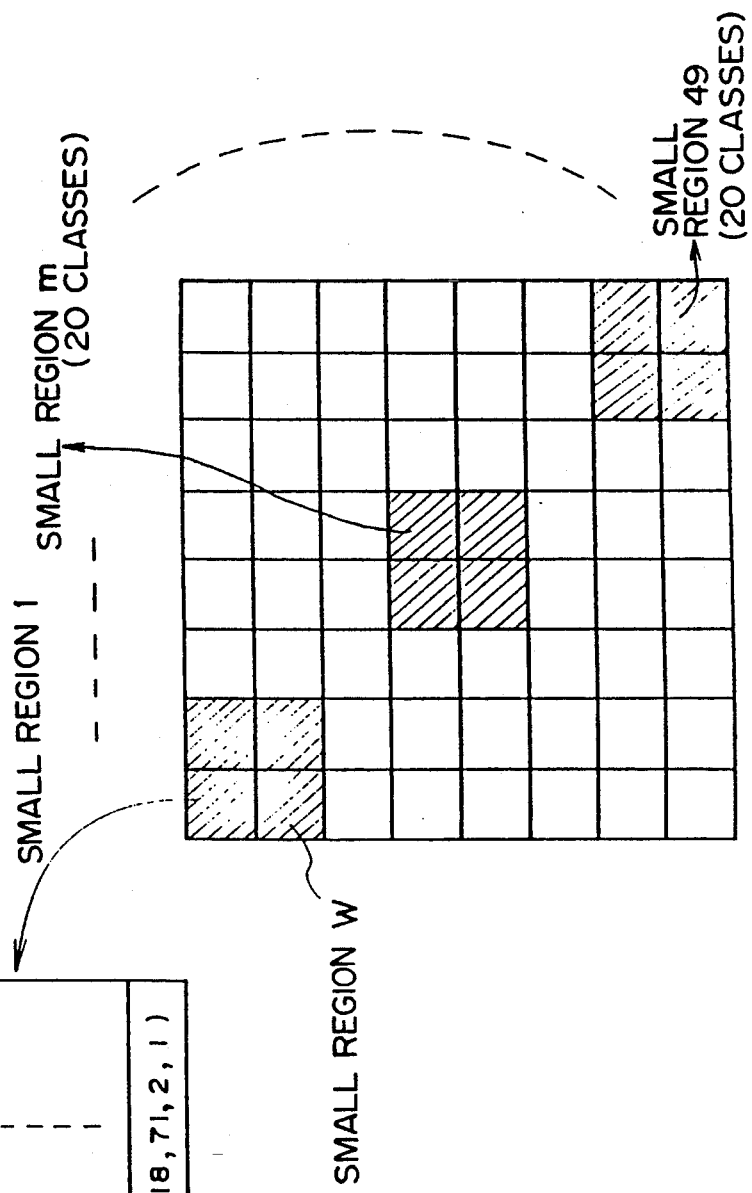

FIG. 16 shows an example in which the character of N=3003 is subjected to a clustering comprising classes of L=20 for respective small region positions (the number of small regions) by the associative matching standard-pattern forming process and the example of the representative vector of the respective classes. The embodiment is briefly shown with regard to the small region number 1. As has been explained, in the present embodiment, the feature vector of 196 dimensions obtained as the type direction line element feature quantity is divided into partial feature vectors of four dimensions corresponding to the respective positions of 49 small regions. The respective partial feature vectors are independently classified in the same class. One representative vector represents one respective class. As explained in the paragraph of "feature of type direction line element feature quantity extraction method", 49 pairs of partial feature vectors of four dimensions represent 49 partial features corresponding to respective small region positions of the type pattern represented by the character image data 413 of FIG. 4, namely, the partial information. Therefore, in the Chinese character pattern, for the small region number 1 in FIG. 16, characters in which the partial patterns, such as "hen" and "tsukuri" comprising a Chinese character in the upper left corner of 3003 type image data, are similar, are classified into the same class. In respective positions of the small region, one character is always classified into one class and the class in which one kind of character is entered may differ depending on the respective small regions.

The above method finally corresponding to the method of extracting partial patterns such as "hen" and "tsukuri" in Chinese characters in Japanese, necessitates various kinds of algorithms depending on the form of "hen" and "tsukuri". In contrast, the present method is characterized in that it does not depend on the kind of the character and does not require a complex algorithm.

The feature of the partial pattern can be formed into a dictionary without recognizing the partial pattern, namely, without recognizing the name of "hen" or "tsukuri" and in an extremely simple and mechanical manner.

Associative Matching Recognition Process

The type-direction line-element feature quantity 415 corresponding to the characteristic image data 413 of FIG. 4 obtained by processes S15 to S23 in FIG. 5 is pattern-matched with the associative matching standard pattern previously stored in the associative matching standard-pattern dictionary unit 411 by the above-recited associative-matching standard pattern forming process. This enables a recognition of the type image data 413. In this case, the first embodiment is characterized by the recognition process by the associative matching method as explained later. The algorithm is realized by processes S24 to S27 in FIG. 5. These processes are explained hereinafter.

(e) A position m of a small region of 16×16 dots explained in FIG. 13A is determined. The partial feature vector of four dimensions is determined as $y^{(m)}$ corresponding to the position m of a small region, and selected from among the feature vectors of 196 dimensions which are type direction line element feature quantity 415 corresponding to the unknown input and obtained by the process S23 in FIG. 5. The distance $D^{(m)}_i$ between the partial feature vector $y^{(m)}$ and each one of L representative vectors $\overline{X}^{(m)}_i$ in each class of the associative matching standard pattern registered with corresponding to the position m of the small region associative matching standard pattern dictionary 411 in FIG. 4 are calculated and matching is obtained (FIG. 5, S24), namely, $$D^{(m)}_i = \|y^{(m)} - \overline{x}^{(m)}_i\| \quad (6)$$
$$(i = 1 \sim L)$$

where $$|y^{(m)} - \overline{X}^{(m)}_i|$$

represents the distance between the partial feature vector $y^{(m)}$ of the unknown input and the representative vector $\overline{X}^{(m)}_i$, and is calculated as the sum of the euclidean distance between $y^{(m)}$ and $\overline{X}^{(m)}_i$.

Namely, $$\|y^{(m)} - \overline{x}^{(m)}_i\| = \sum_{k=1}^{4} (y^{(m)}_k - \overline{x}^{(m)}_{i,k})^2 \quad (7)$$

where $y^{(m)}_k$ and $X^{(m)}_{i,k}$ represent elements of $y^{(m)}$ and $X^{(m)}_q$ respectively.

(f) The classes in which the smaller upper $\alpha$ distances $D^{(m)}_i$ become $$D^{(m)}_{i1} \leq D^{(m)}_{i2} \leq \ldots \leq D^{(m)}_{i\alpha} \quad (8)$$

are extracted. At this stage, $D^{(m)}_{i1}$ is the smallest distance among $D^{(m)}_i$ (i=1 to L), $D^{(m)}_{i2}$ is the second smallest distance and $D^{(m)}_{1\alpha}$ is the $\alpha$th smallest distance. The points are given only to the characters of the upper $\alpha$ classes $C^{(m)}_{in}$ (n=1 to $\alpha$) (FIG. 5, S25) namely, the point $P(X^{(m)})$ corresponding to the character whose partial feature vector $X^{(m)}$ belongs to $C^{(m)}_{in}$ is calculated as $$P(x^{(m)}) = \alpha - n + 1 \quad (9)$$

$(n = 1 \sim \alpha)$ and is accumulated on the memory area for accumulating the point of the character. The memory region is provided within the associative matching recognition unit 409 in FIG. 4, the point is not given to the character belonging to classes less than the $\alpha$th.

(g) Processes described in (e) and (f) are conducted for the position m (m=1 to 49) of 49 respective small regions (in FIG. 5, S26→S24).

(h) When the processes described in (i) and (f) for the position of the small 49 small regions are completed, the character code is output as the candidates of the recognition result are arranged in order, starting with a character with a high number of points thereby providing the rough classification result 416 in FIG. 4 (FIG. 5, S27).

Figure 17:
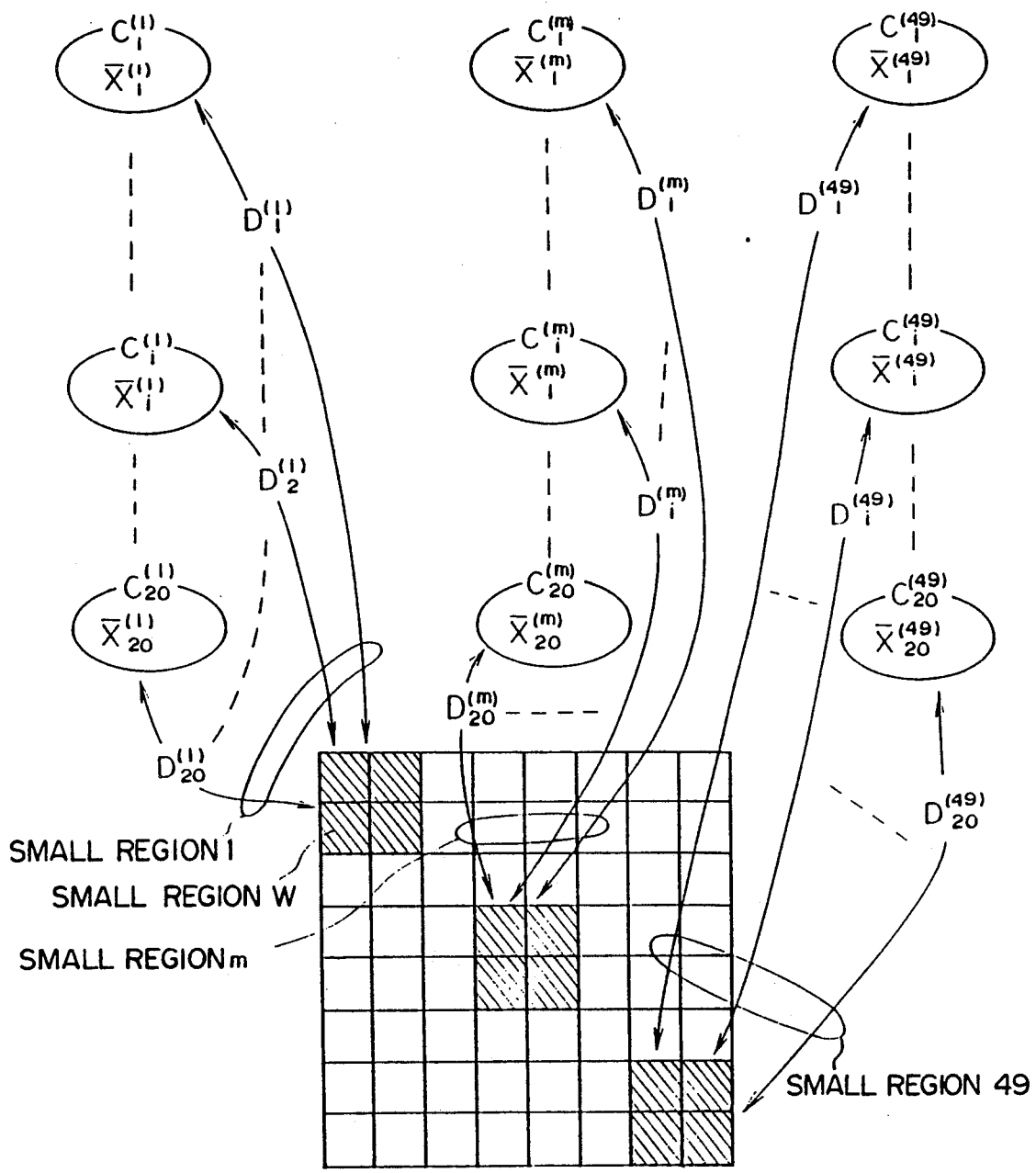
FIG. 17 shows the operation of the distance calculation according to the associative matching method.

FIG. 17 shows a method of calculating the distance when the dictionary is subjected to L=20 classes as a clustering with regard to each of the 49 positions of the small region (the number of the small region) in the associative matching standard pattern dictionary. As is clear from the drawing, the first embodiment method need not calculate the distance of the respective character kinds and may have only to calculate the distance of the representative vector $\overline{X}^{(m)}_i$ of respective classes at every position of the respective small regions.

As shown in FIG. 18, a point is given to the class having a small distance in every small region based on equations (8) and (9) when the unknown input is a 「巡」 of a Chinese character in Japanese. In this case, at every position of the small region, the point is given to the upper five classes, namely, $\alpha = 5$. Therefore, for the point $P(X^{(m)})$ given by equation (9), five points are given to a class of n equal to the first grade, namely n=1, four points are given to a class of the second grade, namely n=2, and three, two and one points are respectively given to the lower classes. The high points (5 or 4 points) are generally given to numbers 1 to 49 of the small regions included in the class in which the Chinese character 「巡」 is included. Therefore, as the final point of the accumulation result, the point of the Chinese character 「巡」 becomes the highest and is output as the first candidate of the rough classification result 416 from associative matching recognition unit 409 in FIG. 4.

Review of the Calculation Amount of the Associative Matching Recognition Process The amount of calculation in the prior art recognition method is compared with that in the associative matching recognition method in the first embodiment. The prior art is stated in the background technology, namely, all checking method for performing a recognition based on the distance obtained by calculating the distance between the standard pattern of the feature vector $X_i$ (i=1 to 3003) of 196 dimensions regarding 3003 characters and the feature vector y of the unknown input of 196 dimensions. The distance calculation equation of this instance is $$D_i = \|y - x_i\| = \sum_{k=1}^{196} (y_k - x_{i,k})^2 \quad (10)$$

$(i = 1 \sim 3003)$ $y_k$ and $X_{ik}$ represents an element of respective dimensions of the feature vector y and $X_i$. The number of calculations required for an arithmetic operation of equation (9) for a feature vector is 196 in both subtraction and multiplication operations, and it is 195 in the addition operation. Suppose that the number of calculations required for the addition operation is the same as that required for the subtraction operation and that one multiplication operation is equivalent to two addition operations and the total number of calculations required to perform a calculation of the 3003 characters is converted to the equivalent number of addition operations, as follows.

$$(196 + 196 \times 2 + 195) \times 3003 = 2351349 \qquad (11)$$

The number of calculations required to perform an associative recognition in the first embodiment may be calculated based on equations (6) to (8). Namely, in equations (6) and (7), the number of calculations required to calculate the distance between the feature vector $y^{(m)}$ of the unknown input and one representative vector $\overline{X}^{(m)}{}_i$ is four times that required for the subtraction and the multiplication, and three times that required for the addition in equations (6) and (7). As in the previous case the number of calculations required for the addition is the same as that required for the subtraction, and the number of calculations required for one multiplication corresponds to that required for two additions when the above calculation is conducted for a single position of the small region, and supposing the class number $L = 20$, $$(4 + 4 \times 2 + 3) \times 20 = 30 \qquad (12)$$

is established. To form the calculation sequence of the upper $\alpha$ digits of equation (8) in respective small region position, supposing $\alpha = 5$ and $L = 20$ classes, $$5 \times 20 = 100 \qquad (13)$$

subtractions (amplitude comparison calculation) are necessary. Further, the number of calculations in which the points previously calculated according to equation (9) are accumulated on the character belonging to respective classes $C^{(m)}{}_{in}(n = 1 - \alpha)$ of the upper number is as shown in the following equation.

$$1 \times 110 \times 5 = 550 \qquad (14)$$

Supposing that the addition is conducted once per character, the class number $\alpha = 5$ and the average number of characters per class is 110. The amount of calculation necessary to determine the position of one small region is 950 from the equations (12), (13) and (14). Therefore, the number of calculations of the whole position of the 49 small region is (15).

$$950 \times 49 = 46550 \qquad (15)$$

Next, the second prior art recognition method which is intermediate between the first prior art recognition method and the recognition method of the present invention is explained. This method is similar to the present recognition method in that the distance calculation between the representative vector $\overline{X}^{(m)}{}_i$ of respective classes and the feature vector $y^{(m)}$ of the unknown input with regard to the position of the small regions is conducted. Thereafter, the distance between the representative vectors of the classes in which one character kind is included and the feature vector $y^{(m)}$ of the unknown input is referred to from the result of the distance calculation with respect to respective positions of the small regions. Accumulation can be conducted for all positions of the 49 small regions and the total distance is calculated for one character. This process is repeated for all the characters, namely, the 3003 characters, and produces a recognition result candidate in accordance with the smaller distance. In this method the initial distance calculation is similar to that of equations (6) and (7) and the number of calculations is the same as that of equation (12). The number of calculations of the total distance per character is an accumulation of the 49 small region positions and the addition is conducted 49 times. Therefore, the number of calculation for all of the 3003 characters becomes as follows, considering equation (12).

$$49 \times 3003 = 147147 \qquad (16)$$

The total number of calculations becomes the sum of the results of equations (16) and (12).

$$300 + 147147 = 147447 \qquad (17)$$

Based on the above test result, the number of calculations required by the first embodiment is about 1/50 that required by the prior art. A simple calculation for comparing the first embodiment with the first prior art method through all checking methods can be obtained within 1/50 the number of calculations. Even if an increase in calculation time caused by the complicated memory access and the determination of the condition becomes complicated, thereby increasing the calculation time, a large number of calculations is deleted. When compared with the second prior art method, $\frac{1}{3}$ of the calculations are sufficient from equations (11) and (17). The second prior art method is the same as that of the present embodiment in that a dictionary is formed by classifying the position of respective small regions. The total distance was calculated in the prior art for all the characters. In this embodiment, a point is given to the character of the upper classes in which the distance is small, thereby providing a final recognition result candidate and also enabling the number of calculations to be reduced.

A Review of the Recognition Capability of the Associative Matching Recognition Process In the method of this embodiment, the feature vector is classified for respective positions of the small regions and is replaced by respective representative vectors. Thus, the amount of information for recognition is decreased as compared with that in the first prior art method, using all checking methods. In the recognition experiments using various kinds of word processor printing characters having 3003 characters including the first 2965 standard characters of the JIS, (Japan Industry Standard), the number of classes L of 49 positions of the small region is 20 to 30 (as should be referred to by item of "associative matching standard pattern forming process"). When $\alpha = 5$ (as is referred to "associative matching recognition process") a recognition ratio in the first grade of more than 99% (the ratio at which the recognition result candidate of the highest point is obtained as the rough classification result 216 in FIG. 4) can be obtained and a recognition ratio similar to those of all the checking methods can be obtained.

The method of the present invention greatly reduces the number of calculations while maintaining a recognition ratio similar to that of the prior art.

Fine Classification Process

An associative matching process is used to output a rough classification result 416 from associative matching recognition unit 409 in FIG. 4 as a candidate of the recognition result, such as the first candidate, the second candidate, etc., in accordance with the order of the character in which a high point is accumulated as a result of the associative matching. Therefore, the possibility that an objective recognition result is included in the rough classification result 416 of the upper 5th to 10th grades selected from among thousands of characters becomes almost one hundred percent.

Based on the rough classification result 416 of the upper 5th to 10th grades obtained as recited above, a detailed matching is conducted between the partial information of respective recognition result candidates and the detailed matching, a precise fine classification process ordering similar character candidate is conducted.

In the present embodiment, to analyze the above partial information, the partial feature vectors of four dimensions in the predetermined position of the small region are compared and, selected from among type direction line element feature quantity 415 obtained from the feature quantity extracting portion 407 in FIG. 4. As explained in the item "feature of method of extracting the type direction line element feature quantity", 49 pairs of feature vectors of four dimensions in the feature vector of 196 dimensions obtained as type direction line element feature quantity 415 represents 49 partial features of the position of small regions of the type pattern represented by type image data 413 in FIG. 4, namely, the partial information. In character candidates such as 「 大 、 大 、 大, or 「 土 、 土 」 in Japanese, which are easily mistaken, attention is paid to the position of the small region where error recognition easily occurs and a comparison is conducted between the partial feature vectors corresponding to the position of the small region, thereby facilitating the analysis of the partial information.

As one process, easily mistaken characters constitute respective groups and are made into a table such as a fine classification table. For example, as shown in FIG. 19, other easily mistaken relational characters are registered with regard to respective characters of the first standard Chinese character selected from among 2965 characters as shown in FIG. 19. In this case shown by "null" in FIG. 19, the relational character sometimes does not exist and in this case a fine classification recognition process is not conducted. To simultaneously recognize the respective characters, flag "1" designates which portion of the small region is used out of the number 1 to 49 small region a the partial feature vector. The number of small regions to be used is determined as being the same within respective groups in which a character is registered as a relation character. For example, refer to the table 「 大 」 and 「 大 」 as shown in FIG. 19. The position of the small region represented by flag "0" means that it is not used as a fine classification of the character candidate. A fine classification table previously obtained as recited above is registered in a fine classification dictionary unit 412 of FIG. 4. A standard partial feature vector of the position of the small region to which a flag "1" is assigned in the fine classification table of FIG. 19 with respect to respective characters, is registered in a fine classification dictionary unit 412 as a fine classification dictionary.

Fine classification unit 410 in FIG. 4 executes the following fine classification process by using the above fine classification table and fine classification dictionary.

For respective recognition result candidates obtained as the rough classification result 416 of the upper 10 ranks output from associative matching recognition unit 409 of FIG. 4, a fine classification table registered in fine classification dictionary unit 412 in FIG. 4 is referred to. It is searched or detected whether or not a character similar to the candidate character is included as a candidate character of the order (for example, rank 1 or 3) continued on the order (rank 2) of the candidate character within the rough classification result 416 and it is determined whether or not a fine classification process, namely, a partial matching, is necessary (FIG. 5, S28→S29).

Where a relational character of the candidate character does not exist (in the case of "null" in FIG. 19) or a relational character concerning the candidate is not included as a candidate character having a rank following the candidate character within the rough classification result 416, the fine classification process is not necessary. In addition, the rough classification result 416 can be output as the fine classification result 417 of FIG. 4. It is deemed to be the final recognition result (FIG. 5, S29→S31).

On the other hand, where a relational character of a candidate character is included as a candidate character having the rank following that of the candidate character in the rough classification result 416, partial matching can be carried out using the following algorithm (FIG. 5 S29→S30).

①. First, the fine classification table is referred to and the position of the small region corresponding to the candidate character is detected.

②. Next, a partial feature vector corresponding to a position of a small region detected by 1 is extracted from the type direction line element feature quantity 415. This quantity is input corresponding to the rough classification result 416 previously obtained from feature quantity extracting unit 407 of FIG. 2.

③. The distance between the partial feature vector extracted in ② and the partial feature vector in the fine classification dictionary corresponding to the candidate character and the relational character is calculated. The order of the candidate character and the relational character is changed in accordance with the smaller distance.

The recognition result candidate with the new rank obtained by the partial matching process from ① to ③ is finally output as the fine classification result 417 of FIG. 4 (FIG. 5, S30→S31). Candidate characters other than the above candidate character and that corresponding to the similar character which are selected from the rough classification result 416 are output as the fine classification result 417 in the same recognition order as in the rough classification recognition.

The character candidate which is easily misrecognized, is selected from the recognition result candidate obtained as the rough classification result 416 by the fine classification process can precisely determine the recognition order. Therefore, the final recognition ratio can be further increased.

Other Mode of the First Embodiment

The above embodiment applies the associative matching recognition method based on the first principle of the present invention to character image data recognition. The character direction line element feature quantity obtained from the character image data is used for the feature quantity for recognition, and the fine classification is combined therewith.

It is possible to apply the present invention to the recognition using various feature quantities of the type image data such as stroke information, as well as the above type direction line element feature quantity.

It is not limited to recognition of character image data but is applied to word recognition based on the second principle. In this case, for example, the speech spectrum envelope parameter (cepstrum coefficient) of every frame at respective timings of the word pattern may be used as respective feature quantities of a plurality of regions and may be applied to associative matching recognition according to the present invention. The dictionary used in this case may store a feature quantity of a plurality of word patterns.

This invention may be applied to various other input pattern recognition methods.

A spectrum envelope pattern of a speech frequency may be changed to an image to provide an input pattern, thereby enabling a feature quantity similar to the type direction line element feature quantity explained by referring to FIGS. 10 to 14, thereby enabling the speech to be recognized.

Explanation of the Second Embodiment

The second concrete embodiment is explained based on the third principle of the invention.

Whole Structure of the Second Embodiment

Figure 20:
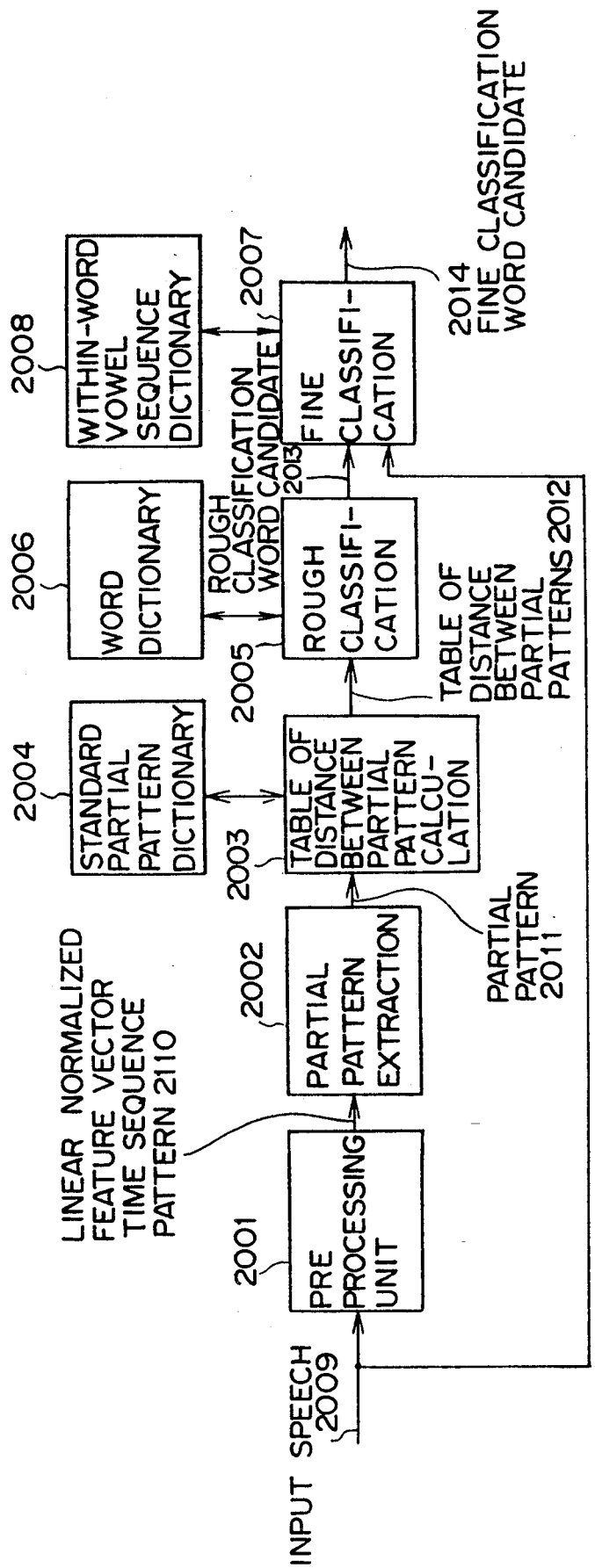
FIG. 20 is a block diagram showing the whole structure of the second embodiment.

FIG. 20 shows the complete structure of the second embodiment.

Input speech 2009 is first input to preprocessing unit 2001 and respective processes (described later) such as cut-out of a word period, normalization, or speech analysis are carried out, thereby outputting feature vector time sequence pattern 2010 which is subjected to a linear normalization.

Feature vector time sequence pattern 2010 is input to the partial pattern extraction unit 2002, thereby providing the partial pattern 2011.

Partial pattern 2011 is input sequentially to a table of distances between partial patterns calculating unit 2003, in which the distance between the input and respective standard partial patterns stored in the standard partial pattern dictionary unit 2004 is calculated, thereby forming table 2012 of distances between partial patterns.

Table 2012 of distances between partial patterns 2012 is input to a rough classification unit 2005 in which the distances of respective words are calculated based on the table of distances between partial patterns 2012 by referring to word dictionary unit 2006. The word recognition is then executed based on the calculation result, thereby providing a rough classification word candidate 2013.

A rough classification word candidate 2013 is input to a fine classification unit 2007. The fine classification unit 2007 again receives the input speech 2009 and performs a fine classification. At this stage, within-word vowel sequence dictionary unit 2008 is referred to and a fine classification is conducted. As a result, a final fine classification word candidate 2014 is obtained.

Operation of this Embodiment

The operation of this embodiment is explained hereinafter.

Operation of the Preprocessing Unit

Figure 21:
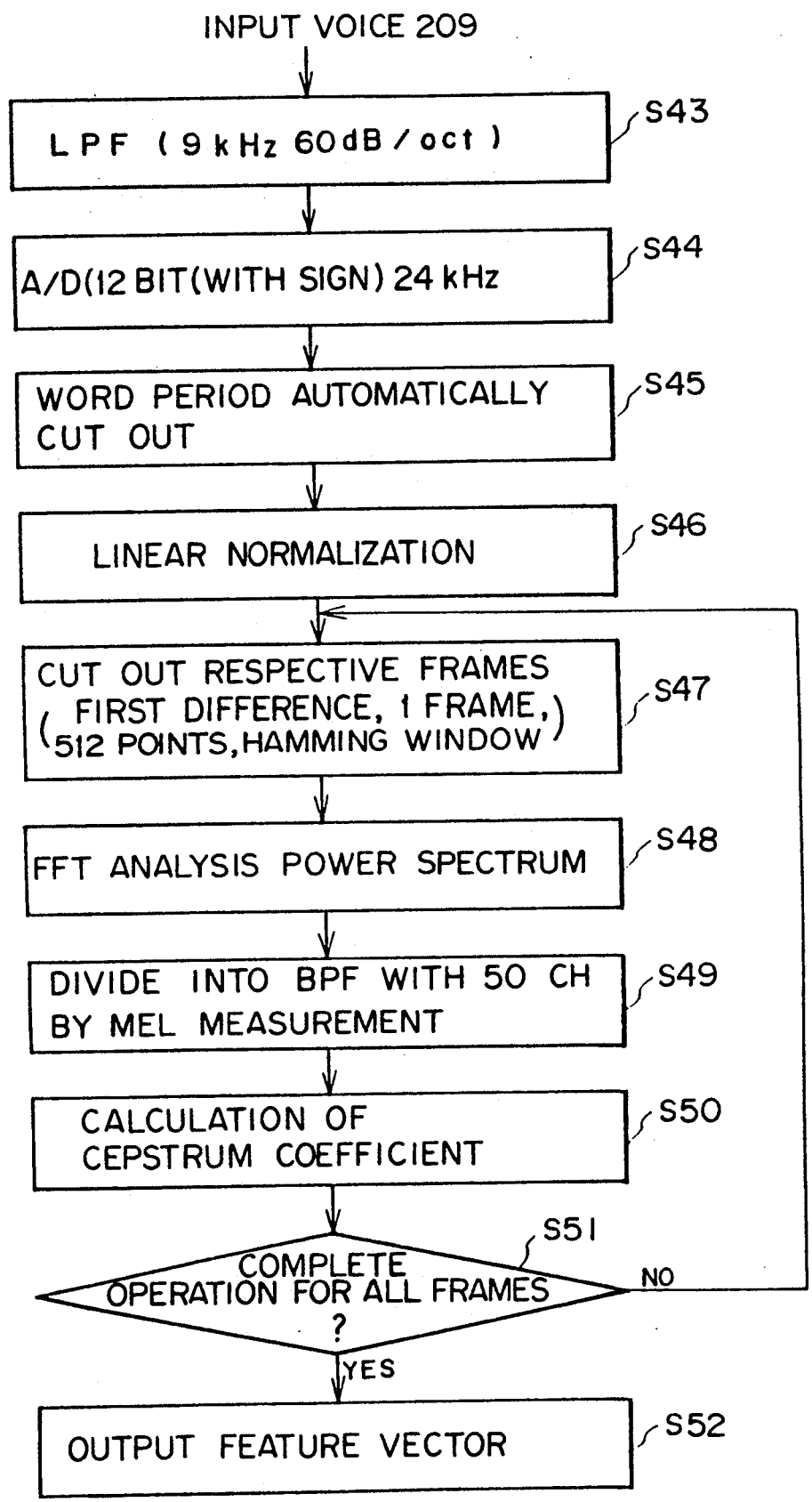
FIG. 21 is an operational flowchart showing the operation of the preprocessing unit, FIG. 22 explains the process of automatically cutting out the word period.

The operation of preprocessing unit 2001 of FIG. 20 is explained. FIG. 21 shows an operational flowchart of preprocessing unit 2001 and the explanation is made by referring to it.

Input voice 2009 is conducted to a low pass filter (LPF) of 9 kHz and 60 dB/oct (S43).

It is sequentially A/D-converted to a digital audio signal with a sampling frequency of 24 kHz and a quantizing accuracy of 12 bits including a sign(S44).

Figure 22:
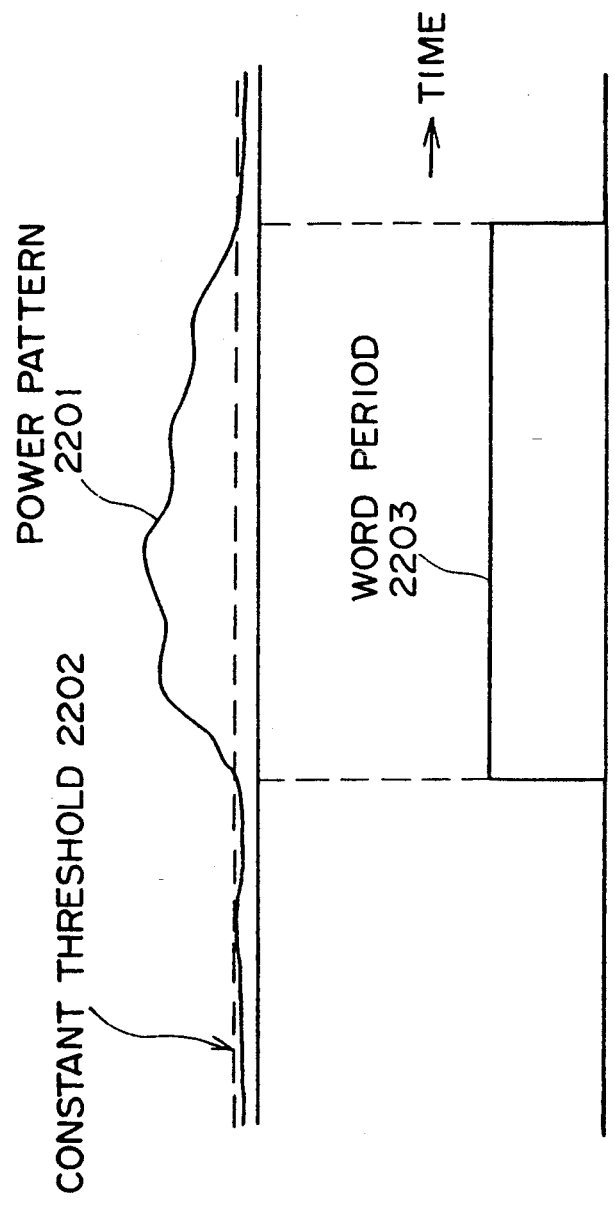

Next, the signal's change in power with time is calculated and a constant threshold value 2202 is determined for power pattern 2201 obtained as shown in FIG. 22. Then word period 2203, as shown in FIG. 22, is automatically cut out (S45).

Next, the word period cut out as stated above is subjected to a linear normalization to provide 48 frames in the direction of time (S46). The frame indicates the basic time unit for use in speech analysis which will be explained later. One frame indicates 21.3 msec.

Speech analysis is conducted every frame (loop of S47→S51→S47).

The digital speech signal subjected to linear normalization as stated above, is analyzed starting with its head. The speech signal is multiplied by a Hamming Window with a time length of 21.3 msec (512 points), thereby enabling the digital speech signals of respective frames to be cut out (S47).

The signals of respective frames (cut out as recited above) are subjected to a FFT (high speed fourier transform) of 512 points and are converted to a power spectrum (S48).

The obtained power spectrum of 512 points is subjected to a division and integration by a band pass filter (BPF) of 50 channels having an equal interval in a mel scale and a frequency axis is converted to a mel measurement (S49).

A cepstrum coefficient (x1', x2', ... x10') of up to 10 dimensions is obtained by a cepstrum analysis (S50). However, the obtained cepstrum coefficient is normalized in accordance with the following equation.

$$x_i = x_i' / \sum_{i=1}^{10} x_i'^2 \qquad (18)$$

The above process is repeated for all the 48 frames of a single word period (S51→S47). The cepstrum coefficient normalized by the above equation (18) for 48 frames is output from preprocessing unit 2001 of FIG. 20 as the feature vector.

Standard Partial Pattern, Word Dictionary Forming Process

In the above embodiment a word recognition is conducted using a feature vector obtained as recited above. Where the later described word recognition is conducted, it is necessary to previously register respective standard partial patterns and a word dictionary, in the standard partial pattern dictionary unit 2004, and in the word dictionary unit 2006 as shown in FIG. 20. Before the word recognition process, a process for forming the standard partial pattern and word dictionary will be explained.

The learning pattern of input word 2009 is processed by preprocessing unit 2001 and the time sequence pattern of the feature vector of the word W* subjected to a linear normalization of n frames (n=48 frames in the above explanation) in the time direction is expressed as $$W_k = (X_{k1}, X_{k2}, \ldots, X_{kn}) \quad (19)$$

$$k = 1, 2, \ldots, N$$

Figure 23:
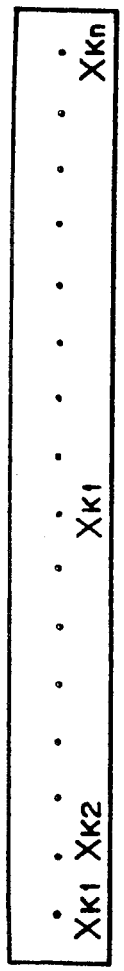
FIG. 23 shows the time sequence pattern of the feature vector of the word, FIG. 24 explains the process of extracting partial patterns.

FIG. 23 should be referred to, wherein N represents the kind of word, $X_{k,t}$ (t=1,2,... n) is the feature vector (comprising cepstrum coefficients of 1st-10th dimensions) of the t th frame in a time direction of the word $W_k$.

Figure 24:
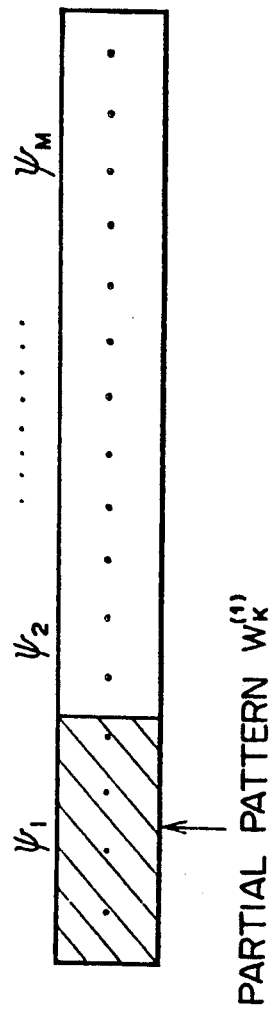

Next, the time sequence pattern of the feature vector of FIG. 23 is input to partial pattern extraction unit 2002 of FIG. 24 and a mask $\Psi_m$ (m=1 to M) is applied to the feature vector time sequence pattern of the word $W_k$ as shown by the slanted line in FIG. 24 and partial pattern $W^{(m)}_k$ is extracted. Namely, $$w^{(m)}_k = \Psi_m(W_k) \quad (20)$$

the following statistically determination will be carried out as equation (20). A collection of partial patterns obtained by performing the arithmetic operation of equation (20) of respective vector time sequence patterns of N kinds of word W1, W2, ... $w_N$ is expressed as $$\{w_1^{(m)}, w_2^{(m)}, \ldots, w_N^{(m)}\} \quad (21)$$
$$m = 1, 2, \ldots, M$$

By paying attention to a portion pattern $W^{(m)}_k$ corresponding to a mask $\Psi_m$ among a collection of partial patterns expressed by equation (21), N kinds of words $W_1, W_2, \ldots, W_N$ are classified into T classes $C^{(m)}_i$ (i=1 to T<N). This classification is conducted by a sequence using a clustering algorithm according to the furthest neighbor algorithm. $C^{(m)}_i$ represents the i th class of the partial pattern corresponding to the mask $\Psi_m$.

① $C^{(m)}_i = \{w^{(m)}_i\}$, (i=1,2, ..., N)
   count = N

Namely, here they are classified into N classes as an initial state and respective classes comprise a partial pattern $W^{(m)}_i$, count means variable number representing the number of the class division and upon count=T, the clustering operation is ended.

② Find $C^{(m)'}_i$, $C^{(m)'}_j$ satisfying the following equation $$D(C^{(m)'}_i, C^{(m)'}_j) = \min_{i,j} \{D(C^{(m)}_i, C^{(m)}_j)\}$$

where $$D(C_i^{(m)}, C_j^{(m)}) = \max \{d(w_p^{(m)}, w_q^{(m)})\} \quad (22)$$
$$w_p^{(m)} \in C_i^{(m)}, w_q^{(m)} \in C_j^{(m)}$$

$$d(w_p^{(m)}, w_q^{(m)}) = \sum_t (w_{pt}^{(m)} - w_{qt}^{(m)})^2$$

wherein, $W^{(m)}_{pt}$ and $W^{(m)}_{qt}$ represent a feature vector of the t th frame in the time direction within respective partial patterns $W^{(m)}_p$, $W^{(m)}_q$ and $d(W^{(m)}_p, W^{(m)}_q)$ defined by the above equation shows the euclidean distance of the partial patterns $W^{(m)}_p$ and $W^{(m)}_q$.

③ $C^{(m)'}_i$, and $C^{(m)'}_j$ are integrated to provide a single class.

④ count = count − 1

⑤ if the count is not equal to T, steps ② to ④ are repeated and if the count is equal to T, the clustering process is completed.

The above clustering algorithm classifies respective partial patterns $W^{(m)}$, (K=1 to N) of N words $W_1, W_2 \ldots W_N$ corresponding to a single mask $\Psi_m$ into T classes $C^{(m)}_i$, (i=1 to T).

Next, the standard partial pattern $\overline{W}^{(m)}_i$ (i=1 to T) of T classes corresponding to a mask $\Psi_m$ obtained as recited above is calculated. The process calculates the average value of the partial pattern included in the class with regard to respective classes $C^{(m)}_i$ (i=1 to T). The partial pattern corresponding to the mask $\Psi_m$ of the word included in respective classes is represented by the standard partial pattern of the class included in the partial pattern.

Figure 25:
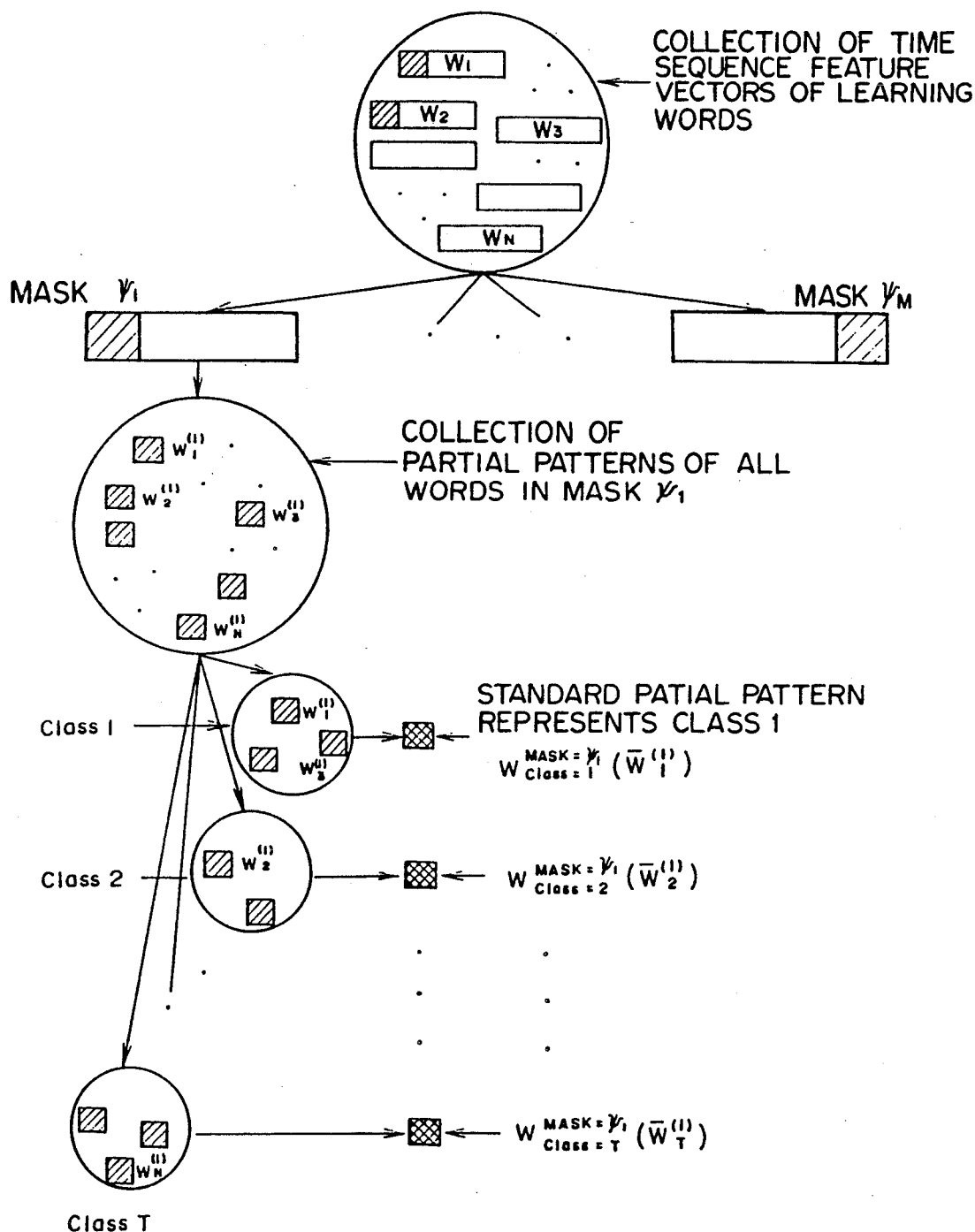
FIG. 25 illustrates a classification of learning words into T classes based on partial patterns specified by mask $\psi$ and a formation of standard partial patterns as representatives of respective classes.

The clustering process and the standard partial pattern forming process are shown in FIG. 25 as an example of the mask $\Psi_1$.

The above process is conducted for respective masks $\Psi_1$ to $\Psi_M$ of N kinds of word speech $W_1, W_2 \ldots W_n$, and independently classified into T classes from respective masks. The standard partial pattern $\overline{w}^{(m)}_i$ (i=1 to T), (m=1 to M) calculated together with the above classifications is stored in standard partial pattern dictionary unit 2004 in FIG. 20.

Next, it is stored in word dictionary unit 2006 in FIG. 20 which classes N words $W_1, W_2 \ldots W_N$ into among T classes for respective masks $\Psi_1$ to $\Psi_M$ by the above clustering process. An example of a word dictionary is shown in FIG. 26. The class number in respective masks $\Psi_1$ to $\Psi_M$ is stored for N words $W_1, W_2 \ldots W_N$. Respective words $W_1, W_2 \ldots W_N$ can be expressed by the collection of standard partial patterns of the class included in respective masks $\Psi_1$ to $\Psi_M$ for all the masks.

Rough Classification Process

A rough classification process for input speech 2009 is conducted based on the standard partial pattern and word dictionary formed as recited above.

Figure 27:
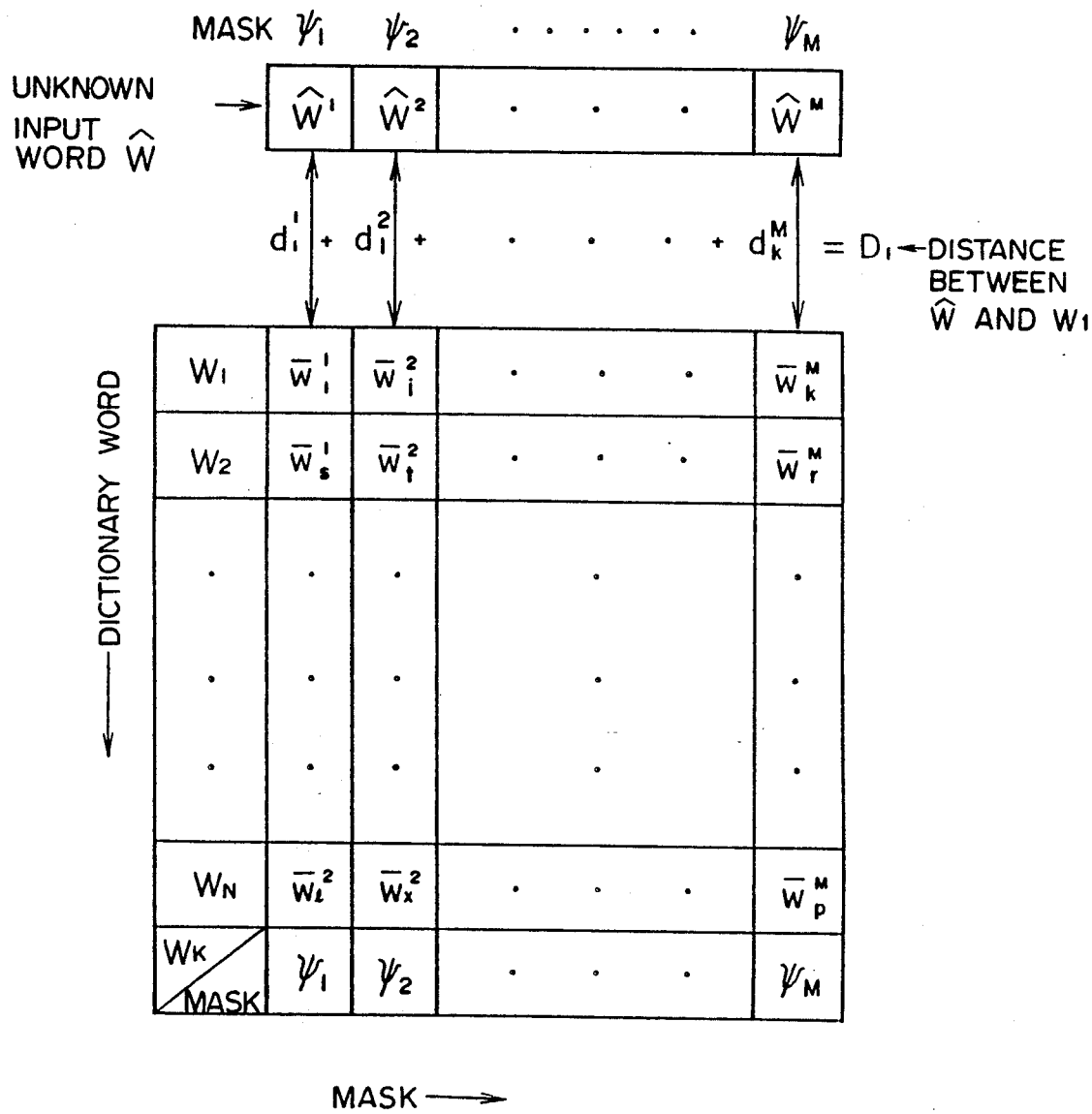
FIG. 27 is a diagram showing an example of a calculation of distance between the unknown input word and the dictionary word, FIG. 28 explains the formation of the table of distances between partial patterns with respect to an unknown input word W, and FIG. 29 explains the operation for obtaining the accumulated distance between vowel sequences based on DP-matching.

The feature vector time sequence pattern 2010 of the unknown input word is calculated by preprocessing unit 2001 of FIG. 20 in a similar manner to the case of the process of forming the standard partial pattern. Then, the output of preprocessing unit 2001 is divided into partial patterns by partial pattern extracting unit 2002 (FIGS. 23 and 24 should be referred to). The unknown input word is expressed as $\hat{W}$ and the distance D ($\hat{W}$, $W_k$) between $\hat{W}$ and the dictionary word $W_k$ is defined by the following equation;.

$$D(\hat{W}, W_k) = \sum_m d^{(m)}_{c(k,m)} \quad (23)$$

wherein, $$d^{(m)}_{c(k,m)} = d(\overline{w}^{(m)}_{c(k,m)}, \hat{w}^{(m)}) \quad (24)$$

$$\hat{w}^{(m)} = \Psi_m(\hat{W}) \quad (25)$$

and wherein c(k, m) is the number of the class to which $W_k$ belongs and $w^{(m)}_{c(km)}$ is the standard partial pattern representing the class in respective masks $\Psi_m$. Therefore $d^{(m)}_{c(k,m)}$ is the distance between the standard partial pattern $\overline{w}^{(m)}_{c(k,m)}$ and the partial pattern $w(m)$ of the unknown input word $\hat{W}$ (in accordance with the equation (22)) and thus the distance between the unknown input word $\hat{W}$ and the dictionary word $W_k$, which is defined by equation (23), is obtained as the sum of the distances between the partial pattern of the unknown input word and the standard partial pattern of the dictionary word in all the masks $\Psi_1$ to $\Psi_M$. An example of the process for calculating the distance between the unknown input word $\hat{w}$ and the dictionary $w_1$ is shown in FIG. 27.

Figure 28:
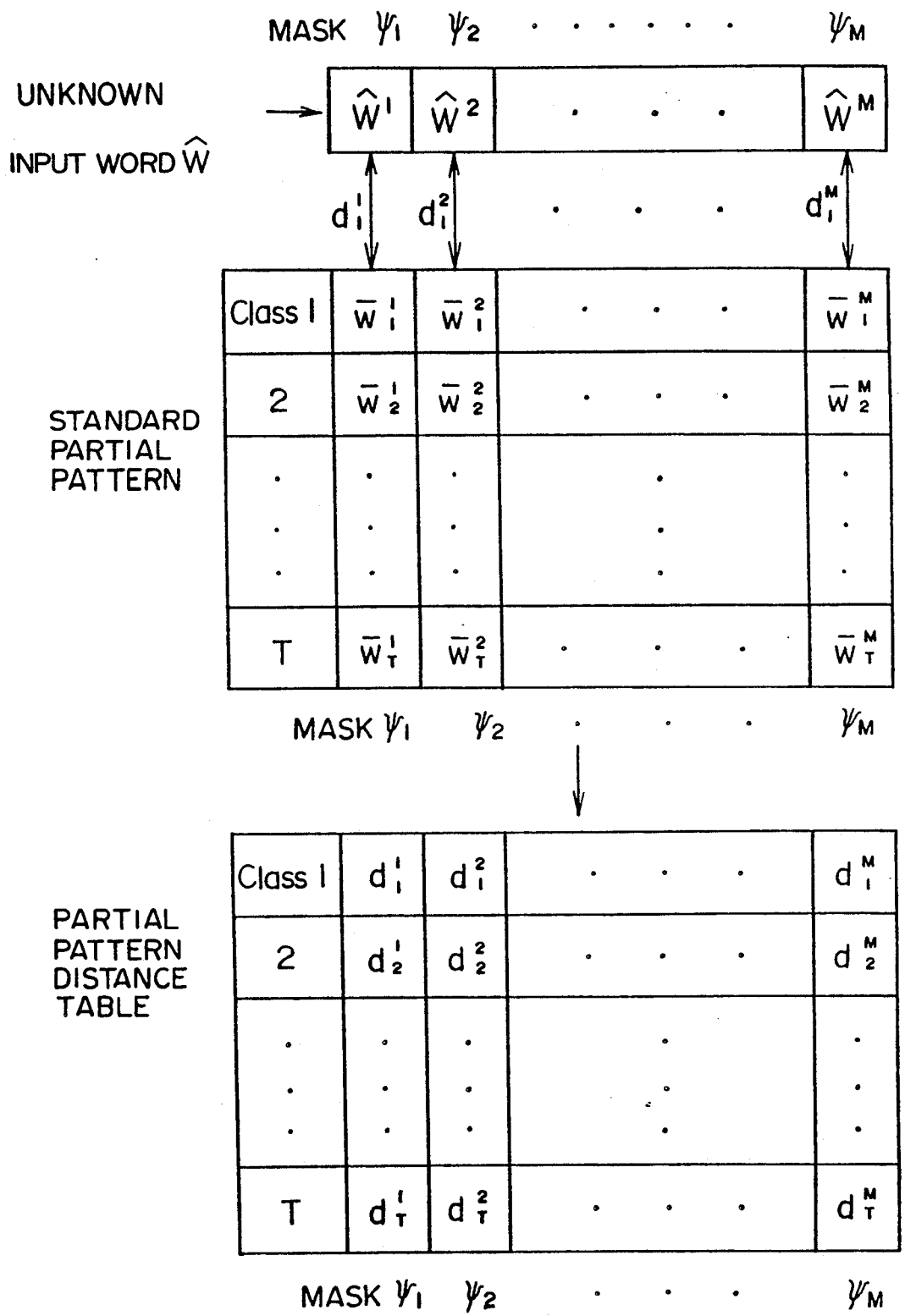

The distance calculation can be conducted with regard to all the dictionary words $w_1$ to $w_N$ in FIG. 20 in the rough classification in this embodiment. In this case, it is not necessary to calculate the distance between the input pattern and the standard partial pattern of the class to which the dictionary word belongs, for respective dictionary words, because a plurality of dictionary words is included in one class. Therefore, before the distances between respective dictionary words are calculated, the distance $d^{(m)}_i$ (i=1 to T) between the partial pattern $\hat{W}^{(m)}$ of the unknown input word $\hat{W}$ and the standard partial pattern $\overline{W}^{(m)}_i$ of respective classes $C^{(m)}_i$ stored in the standard partial pattern dictionary unit 2004 is obtained with every one of the respective masks $\Psi_m$ (m=1 to M), thereby producing a table 2012 of distances between partial patterns as shown in FIG. 28.

Based on the table 2012 of distances between partial patterns obtained by the above process, the rough classification unit 2005 of FIG. 20 calculates the distance between the unknown input word $\hat{W}$ and all the dictionary words $W_1$ to $W_N$ as follows.

When the distance between the unknown input word $\hat{W}$ and the predetermined dictionary word $W_k$ is calculated based on Equations (23) to (25), the distance $d^{(m)}_{c(k,m)}$ between the standard partial pattern $\overline{W}^{(m)}_{c(k,m)}$ of the class to which $W_k$ belongs and the partial pattern $\hat{W}^{(m)}$ of the unknown input word $\hat{W}$ always exists in the table 2012 of distances between partial patterns and the calculation of equation (23) may be conducted merely by extracting the value from the distance.

The above process is conducted for all the dictionary words $W_1$ to $W_N$. As a result the dictionary word which is ranked in a higher order owing to the small betweenwords distance, is output as a rough classification word candidate 2013 in FIG. 20.

Review of the Capability of Recognition of the Rough Classification Process

In the rough classification processes described above the number M of the masks $\Psi_1$ to $\Psi_M$ is 12 to 16 (the mask length is 3 to 4 frames), the number T of the classes is 25 and the kind N of the words to be recognized is 212. For the feature vector, the time sequence pattern 2010 is subjected to a linear normalization to provide a time sequence of 48 frames output from preprocessing unit 2001 of FIG. 20 and then 10th-ranked recognition ratio (i.e. the ratio in which the rough classification word candidate 2013 (FIG. 20) up to 10thrank is correct) is 99.6%. Thus, a high classification ratio is provided. The recognition ratio is similar to that of the pattern matching method of the first prior art and the DP matching method of the second prior art recited for the background technology, as it relates to the 10thranked recognition ratio.

For the rough classification methods in the second embodiment, the number of the matchings per mask is not the number N of respective dictionary words, but may be the number T of respective classes. This would greatly decrease the number of calculations to about 1/10 that of the pattern matching method of the first prior art, and to as small as 1/200 that of the DP pattern matching method of the second prior art. Therefore, it is clear that the present invention is very effective for rough classification to obtain the rough classification word candidate 213 up to the 10th rank.

Fine Classification Process

The above rough classification process can include with high probability the correct recognition result in the rough classification word candidate 2013 (FIG. 20) up to the 10th rank. Then, using rough classification word candidate 2013, the fine classification unit 207 of FIG. 20 performs re-recognition of rough classification word candidate 2013 up to the 10th degree and further can select a rough classification word candidate more precisely up to the higher rank so that the word candidate becomes within the higher rank. Finally, it can obtain the fine classification word candidate 2014 with a higher recognition ratio. The fine classification process is explained hereinafter.

The whole process is explained. The fine classification process in the second embodiment registers the vowel sequence within N kinds of respective dictionary words obtained by the large classification process, as a vowel label in advance.

The vowel recognition is applied to the unknown input word for inputting input word 2009 by a suitable vowel recognition process, thereby providing a vowel sequence corresponding to the unknown input word. The simplest vowel recognition method includes the feature quantities (the cepstrum coefficient and so on) of five vowels of ア 、 イ 、 ウ 、 エ 、 オ as a dictionary and the feature quantities of the five vowels are matched with the feature quantities obtained from the respective frames of the unknown input word. A vowel sequence is obtained for each respective frame. Various other prior art methods exist but the present embodiment can use any method having a recognition ratio for the first ranked word of about 92%.

On the other hand, the vowel sequence of rough classification word candidate 2013 output from the rough classification unit 2005 of FIG. 20 is obtained by referring to the within-word vowel sequence dictionary unit 2008.

The DP matching is performed for the vowel sequence of the unknown input word. The vowel sequence of the rough classification word candidate 2013 is obtained as recited above by using the later-described DP matching algorithm. Words which are not matched, namely, in which the vowel sequence of the unknown input word is not matched with that of the rough classification word candidate, are deleted from the rough classification word candidate 2013. The final fine classification word candidate 2014 is thereby output.

An operation of the above process is explained next. In the vowel recognition process for the unknown input word, the number of the vowel sequence of the unknown input word is not matched with the respective number of the vowel sequence of the rough classification word candidate 2013, as an error may occur in the cutting-out operation. Therefore, the second embodiment does not restrict the number of vowels. It uses the DP matching method. Considering the possibility that the vowel recognition process functions incorrectly for an unknown input word, candidates up to the second rank of the vowel sequence of the unknown input word obtained by the vowel recognition process may be subject to a matching. This process is a feature of this embodiment.

The vowel series recognized through the vowel recognition process for the unknown input word $\hat{W}$ is expressed as $\hat{V}$ $$\hat{V} = (\hat{v}_1, \hat{v}_2, \ldots, \hat{v}_I) \qquad (26)$$

$$\hat{v}_i = (\hat{v}_i', \hat{v}_i'') \qquad (27)$$

$$\{\hat{v}_i', \hat{v}_i''\} = \{/a/,/i/,/u/,/e/,/o/\} \qquad (28)$$
$$i = 1, 2, \ldots, I$$

where equation (28) simply means that $\hat{V}_i'$ and $\hat{V}_i''$ take one of five vowels in the bracket { }, respectively.

I is the number of vowels in the unknown input word $\hat{W}$. $\hat{V}_i$ represents the i th vowel of the vowel sequence recognized by the vowel recognition process applied to the unknown input word $\hat{W}$, and $\hat{V}_i'$ $\hat{V}_i''$ are respectively the first and second candidates of the i th vowel.

On the other hand, the vowel series of the word candidate $W_k$ obtained at the rough classification word candidate 2013 (in case 10th rank, k=1, 2, ... 10), is expressed as $\hat{V}_k$ $$\hat{V}_k = (v_{k1}, v_{k2}, \ldots, v_{kj}) \qquad (29)$$
$$\{v_{kj}\} = \{/a/,/i/,/u/,/e/,/o/\} \qquad (30)$$
$$j = 1, 2, \ldots, J$$

where j is the vowel number of the word candidate $W_k$ and $V_{kj}$ is the j th vowel of the vowel sequence of the word candidate $W_k$.

Matching between the vowel sequence $\hat{V}$ of the unknown input word $\hat{W}$ and the vowel sequence $\hat{V}_k$ of the word candidate $\hat{W}_k$ is conducted by obtaining the accumulated distance D (I, J) using the DP matching algorithm and comparing it with the magnitude of the accumulation distance D.

The accumulation distance D(I, J) between the vowel sequence $\hat{V}$ of the unknown input word $\hat{W}$ and the vowel sequence $\hat{V}_k$ of the word candidate $W_k$ is calculated by the DP matching algorithm given by the following recurrence formula.

①  initial value determination
D(0,0)=0
D(i,0)=D(i,−1)=D(0,j)=D(−1,j)= ∞
 (i=1,2, ..., 1 j=1,2, ..., j)
② recurrence formula
D(i,j)=min(d1,d2,d3)/(1+J)
d1=D(i,j−1)+dis(i,j)
d2=D(i−1,j−1)+2.dis(i,j)
d3=D(i−1,j)+dis(i,j)

$$dis(i,j) = \begin{cases} 0; \text{ if } (v_{kj} = \hat{v}_i' \text{ or } v_{kj} = \hat{v}_i'') \\ 1; \text{ otherwise} \end{cases} \qquad (31)$$

(i=1,2, ..., 1 j=1,2, ..., J)
③ normalization

D(1J)=D(1,J)/(1+J)

As an example, respective vowel sequence $\hat{V}$ and $V_k$ of the unknown input word $\hat{W}$ and the word candidate $W_k$ have the following vowel sequence.

Figure 29:
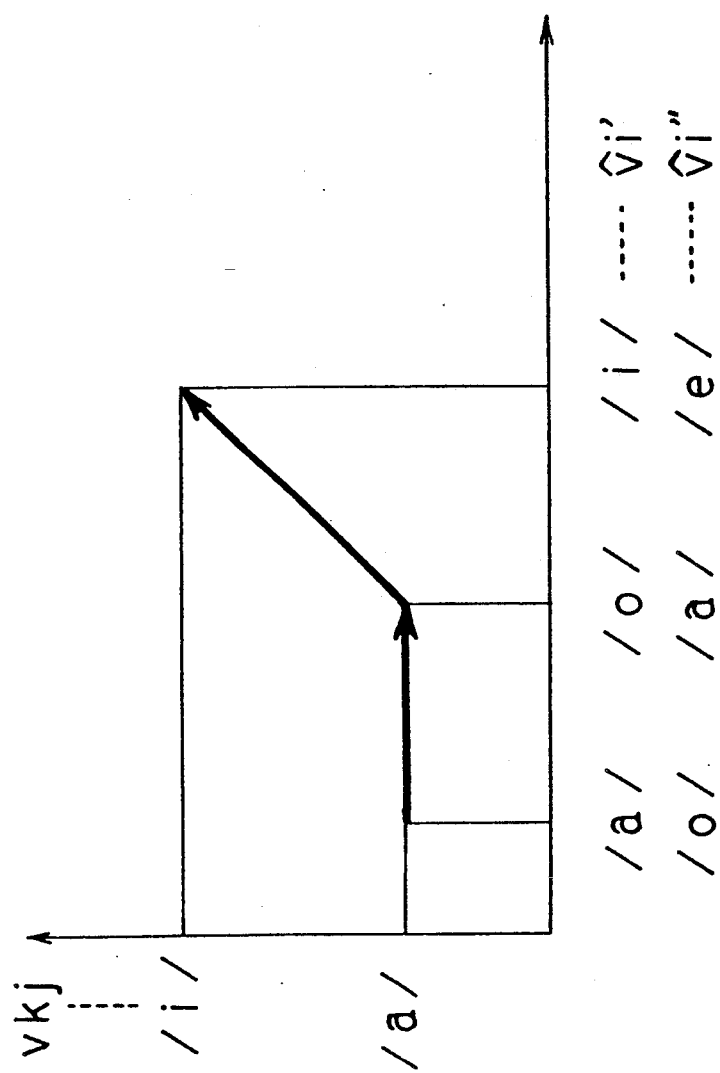

$\hat{V} = (\hat{v}_1, \hat{v}_2, \hat{v}_3)$ namely, I=3
$\hat{v}_1 = (\hat{v}_1', \hat{v}_1'') = \{/a/,/o/\}$
$\hat{v}_2 = (\hat{v}_2', \hat{v}_2'') = \{/o/,/a/\}$
$\hat{v}_3 = (\hat{v}_3', \hat{v}_3'') = \{/i/,/e/\}$
$\hat{V}_k = (v_{k1}, v_{k2})$ namely, J=2
$v_{k1} = /a/$
$v_{k2} = /i/$ In this case, the accumulation distance D (I, J) between $\hat{V}$ and $\hat{V}_k$ is calculated in accordance with the DP matching algorithm recited in ① to ③ above, and the DP matching path becomes as shown in FIG. 29. Thus, the accumulation distance D (I, J)=0. The accumulation distance of the vowel sequence $\hat{V}$ of the unknown input word $\hat{W}$ and the vowel sequence $V_k$ of the word candidate $W_k$ is the minimum. As a result, the word candidate $W_k$ obtained as the large classification candidate 2013 of FIG. 20 remains as the fine classification word candidate 2014 of FIG. 20 for unknown input word $\hat{W}$.

Review of the Recognition Capability of the Fine Classification Process

The recognition ratio of the 10th rank of the rough classification word candidate 2013 is 99.6%. However, as a result of an improvement, the above fine classification process can provide a recognition ratio of the 10th rank of 99.8% and can increase the recognition ratio of the 15th rank to 99.86%. A word candidate selected from the rough classification word candidate 2013 up to the 10th rank thereof can be selected up to the 8th rank by the fine classification candidate 2013. Similarly, the word candidate selected from the rough classification word candidate 2013 up to the 30th rank can be selected up to the 15th rank by the fine classification candidate 2014.

In this case, a small number of rough classification word candidates 2013 is originally selected and a small number of vowel sequences of respective words is selected. Therefore, the DP matching of the vowel sequence of the word candidate $W_k$ and the unknown input word $\hat{W}$ can be carried out at high speed.

An Application of the Second Embodiment

The second embodiment is a method of obtaining the word candidate for the input speech 2009 (FIG. 20) of the unknown input word as the fine classification word candidate 2014. After the word candidate is thus obtained, a further precise recognition is performed based on fine classification word candidate 2014, thus providing the final recognition result. Various processes can be used to achieve this object but they are not recited in detail. The DP matching may be further conducted for the fine classification word candidate 2014 and the input speech 2009. Methods for achieving the highest matching degree may then be used to achieve a final recognition result.

After two-stage recognition process comprising the rough classification process an the fine classification process has been conducted, the above DP matching may be carried out. This can greatly decrease the number of calculations compared with the case where the DP matching is carried out from the beginning. The recognition ratio may be equal to or greater than the case where DP matching is conducted from the beginning.

Another Embodiment of the Fine Classification Process

In the fine classification process in the second embodiment, respective vowels $\hat{V}$ of various vowel sequences $\hat{v}$ of the unknown input word $\hat{W}$ use candidates up to the 2nd rank as shown in equation (27). The distance calculation in the DP matching using the 2nd-ranked candidate is carried out by providing the first candidate and second candidate with the same weight, as shown in equation (31). In the calculation of the distance dis(i, j) in the equation (31), the distance is made 0 where the vowel $V_{kj}$ of the vowel sequence $V_k$ of the word candidate $W_k$ is equal to the first candidate $\hat{V}_i'$ and the second candidate $\hat{V}_i''$.

In contrast, in the following embodiment, different distances are obtained from equation (31), depending on whether the vowel $V_{kj}$ of the vowel sequence $V_k$ of the word candidate $W_k$ is equal to the first candidate $\hat{V}_i'$ or to the second candidate $\hat{V}_i''$. When it is equal to the first candidate $\hat{V}_i'$, the distance is made 0 and when it is equal to the second candidate $\hat{V}_i''$ the distance is determined to be a value between 0 and 1.

Therefore, as a larger weight is applied to the first candidate than to the second candidate, and an appropriate fine classification process can be carried out.

What is claimed is:

1. A pattern recognition apparatus for recognizing an input pattern by extracting feature quantities from the input pattern and matching the input pattern with statistical information about said feature quantities each obtained by classifying a plurality of learning patterns, said pattern recognition apparatus comprising:
   feature quantity extracting means for dividing said input pattern into a plurality of regions and for extracting feature quantities from each of said plurality of regions of said input pattern based upon said plurality of learning patterns;
   classifying means for sequentially selecting each of said regions and for classifying said plurality of learning patterns in each said respective region into a predetermined number of classes based on the feature quantities of said respective region extracted from said feature quantity extracting means for each of said plurality of learning patterns;
   representative feature quantity operating means for calculating statistical information about said feature quantities of respective classes;
   a dictionary storing means for storing said statistical information about said feature quantities of said respective classes and for storing different types of learning patterns in said respective classes;
   similarity operating means for determining a statistical similarity between the feature quantities of respective regions extracted from the feature quantity extracting means for the input pattern which is unknown, and statistical information about the feature quantity of corresponding respective classes in said dictionary storing means;
   point accumulating means for accumulating a number of similarities corresponding to an order of the class of respective learning patterns included in classes of predetermined upper orders of similarity with regard to the respective regions, after searching said dictionary storing means; and
   recognition result candidate output means for outputting recognition result candidates from a highest to a lowest number of accumulated similarities of the learning pattern after an accumulation operation is completed by said point accumulating means for respective regions.

2. The pattern recognition apparatus according to claim 1, wherein
   said input pattern is represented by a two dimensional pattern of a plurality of dots, and said feature quantity extracting means comprises:
   direction component extracting means for extracting a direction component of one dot where the pattern exists from an adjacent dot, for each dot of the input pattern,
   region dividing means for dividing said input pattern into a plurality of regions which overlap each other, and
   partial feature vector operating means for totalling the direction components of respective dots within the respective regions divided by said region dividing means, said direction component determined from said direction component extracting means by applying a weight to said direction component, the weight decreasing from a central portion of the region to a peripheral portion of the region, the totalling of the direction components being conducted for respective directions, and for statistically determining a partial feature vector having a totalling result for a respective direction result as an element of the partial feature vector as the feature quantity of the corresponding regions of the input pattern.

3. The pattern recognition apparatus according to claim 2, wherein,
   said input pattern represented by said two dimensional pattern of said plurality of dots comprises a rectangular type pattern, and
   said region dividing means divides the input pattern into a plurality of rectangular regions which overlap each other.

4. The pattern recognition apparatus according to claim 2, wherein,
   said direction component extracting means has windows in 45-degree, 90-degree, and 135-degree directions, scans respective windows for respective dots of the input pattern and extracts the direction component as the direction corresponding to the window when the pattern exists in the respective windows.

5. The pattern recognition apparatus according to claim 2, wherein,
   said similarity operation means statistically determines a similarity for determining a small value obtained as a sum of second powers of an euclidean distance between respective elements of the partial feature vector of respective regions extracted from said partial feature vector operating means from said unknown input pattern and the respective element of the representative partial feature vectors of the statistical information about said feature quantity of the corresponding respective classes in said dictionary storing means, as a large similarity.

6. The pattern recognition apparatus according to claim 2 further comprising:
   similarity pattern dictionary storing means for, after extracting the partial feature vector corresponding to at least one predetermined region from said partial feature vector operating means for respective similar learning patterns within a plurality of similar learning patterns, storing different types of said respective similar learning patterns, discrimination data for said predetermined region, and the partial feature vector of said similar learning patterns of said predetermined region, predetermined-region similarity operating means for, where the recognition result candidate output from said recognition result candidate output means corresponds to any one of said similarity learning patterns stored in said similarity pattern dictionary storing means, statistically determining the similarity between a) said partial feature vector which is for the unknown input pattern from said partial feature vector operating means and corresponds to the predetermined region obtained from said discriminating data stored in said similarity pattern dictionary storing means, and b) a partial feature vector of respective similar learning patterns stored in said similar pattern dictionary storing means, and a fine classification result candidate output means for outputting the similar learning pattern in an order of highest to lowest similarity as a fine classification result candidate corresponding to said recognition result candidate output with a rank.

7. The pattern recognition apparatus according to claim 1, wherein said classifying means carries out a clustering of the feature quantity of respective regions extracted from the feature quantity extracting means for a plurality of respective learning patterns and classifies a plurality of learning patterns for respective regions, and said representative feature quantity operating means for calculating statistical information bout feature quantity of respective classes by calculating an average of respective feature quantities corresponding to said respective learning pattern in respective classes.

8. The pattern recognition apparatus according to claim 1, wherein, said point accumulating means searches said dictionary storing means and accumulates the number of similarities obtained by adding "1" to a value obtained by subtracting an order of the class from a predetermined order, for respective learning patterns included in classes up to the predetermined order from highest to lowest similarity for respective regions, the number of similarities corresponding to the class.

9. A pattern recognition apparatus for recognizing an input word pattern by extracting a feature quantity from the input word pattern and matching the input word pattern with statistically information about feature quantities each obtained by classifying a plurality of learning patterns, said pattern recognition apparatus comprising:

feature quantity extracting means for directing said input word pattern into a plurality of regions and for extracting said feature quantity from each of said plurality of regions of the input word pattern based on said plurality of learning patterns;

a classifying means for sequentially selecting each of said regions and for classifying said plurality of learning patterns in each respective region into a predetermined number of classes based on said feature quantity of each region extracted from the feature quantity extracting means for said plurality of respective learning patterns;

a representative feature quantity operating means for calculating statistical information about said feature quantities of respective classes;

a dictionary storing means for storing the statistical information about said feature quantities of respective classes and for storing different types of learning patterns included in respective classes for respective regions as a dictionary;

similarity operating means for determining a statistical similarity between said feature quantity of respective regions extracted from the feature quantity extracting means for the input word pattern which is unknown and statistical information about the feature quantities of corresponding classes in said dictionary storing means;

a rough classification means for statistically determining a similarity between said respective learning patterns stored in the dictionary storing means and said unknown input word pattern based on similarity determined by the similarity operating means and for outputting a rough classification word candidate in an order of highest to lowest similarity of the learning patterns;

a vowel sequence recognition means for recognizing a vowel sequence of said unknown input word pattern;

a vowel sequence dictionary means for storing the vowel sequence of respective learning patterns; and a fine classification means for performing dynamic programming matching of a vowel sequence of respective learning pattern corresponding to respective rough classification word candidates extracted from said vowel sequence dictionary storing means and the vowel sequence of said unknown input word pattern output from said vowel sequence recognition means and for outputting fine classification candidates in an order of highest to lowest matching degree of the rough classification word candidate.

10. The pattern recognition apparatus according to claim 9, wherein said feature quantity extracting means comprises normalizing means for normalizing said input word pattern to have a predetermined time period, cepstrum operating means for dividing said normalized input word pattern into a plurality of frames with a same time period and for determining a cepstrum coefficient of predetermined dimensions through cepstrum analysis, and partial feature quantity extracting means for collecting every plurality of frames having a continuous cepstrum coefficient and for extracting the feature quantity corresponding to each one of the plurality of words.

11. The pattern recognition apparatus according to claim 10, wherein the similarity operating means determines a low value obtained as a second power of a sum of euclidean distances between cepstrum coefficients of respective dimensions of respective regions extracted from said partial feature quantity extracting means from unknown input word patterns and the determined cepstrum coefficient of predetermined dimensions, which are statistical information about the feature quantities of the corresponding respective classes in the dictionary storing means.

12. The pattern recognition apparatus according to claim 9, wherein said classifying means carries out a clustering of feature quantities of the respective regions extracted from the feature quantity extracting means from said plurality of learning patterns and classifies said plurality of learning patterns for respective regions, said representative feature quantity operating means calculates statistical information about the feature quantities of respective classes by determining an average of the respective feature quantities corresponding to the respective learning patterns within respective classes.

13. The pattern recognition method according to claim 9, wherein
said vowel sequence recognition means outputs a plurality of vowel sequence candidates as the vowel sequence of the unknown input word pattern, and said fine classification recognition means performs dynamic programming matching between said plurality of vowel sequence candidates and the vowel sequence of the rough classification word candidates.

14. The pattern recognition apparatus according to claim 9, wherein
said vowel sequence recognition means outputs a plurality of vowel sequence candidates with ranks as the vowel sequence of said input word pattern, and
said fine classification means performs a dynamic programming matching between a plurality of vowel sequence candidates and the vowel sequence of respective rough classification word candidates to which a weight is applied in accordance with an order.

15. A pattern recognition apparatus for recognizing the input word pattern by extracting a feature quantity from the input word pattern and matching the input word pattern with statistical information about feature quantities each obtained by classifying a plurality of learning patterns, said pattern recognition apparatus comprising:
feature quantity extracting means for dividing said input word pattern into a plurality of parts and for extracting feature quantities from each respective part of said plurality of parts of said input word patterns;
classifying means for sequentially selecting each of said parts and for classifying said plurality of learning patterns for each respective part into a plurality of classes based on the feature quantity of each respective part extracted from said feature quantity extracting means for said plurality of respective learning patterns;
a representative feature quantity arithmetically operating means for calculating statistical information about said feature quantity of respective classes;
a dictionary storing means for storing the statistical information about said feature quantities of respective classes and for storing different types of the learning patterns included in respective classes, as a dictionary for respective parts;
similarity operating means for determining a statistical similarity between the feature quantities of respective parts extracted from the feature quantity extracting means for the input word pattern which is unknown and the statistical information about the feature quantity of corresponding respective classes within the dictionary storing means;
point accumulating means for accumulating a number of similarities corresponding to an order of classes for respective learning patterns included in a class of a predetermined upper order from highest to lowest similarity for respective parts;
rough classification means for outputting rough classification word candidates with a rank in accordance with the order from highest to lowest number of accumulated similarities of the learning pattern after said point accumulating means completes the accumulating operation for respective parts;
vowel recognition means for recognizing a vowel sequence of the unknown input word patterns;
vowel sequence dictionary storing means for storing the vowel sequence of respective learning patterns as a dictionary; and
a fine classification means for performing matching of the vowel sequence of respective learning patterns corresponding to said rough classification word candidates extracted from said vowel sequence dictionary storing means, and a vowel sequence of said unknown input word pattern output from said vowel sequence recognition means which outputs fine classification word candidates with a rank in accordance with an order of highest to lowest matching degree of the rough classification word candidate.

16. A method of recognizing an input pattern by extracting feature quantities from the input pattern and matching the input pattern with statistical information about feature quantities each obtained by classifying a plurality of learning patterns, the method comprising the steps of:
dividing the input pattern in a plurality of regions;
extracting feature quantities from each of said plurality of regions of said input pattern;
classifying said plurality of learning patterns of each said region based on the feature quantities of each said region extracted from a feature quantity extracting means for each of said plurality of learning patterns;
determining statistical information about said feature quantities of respective classes;
storing said statistical information about said feature quantities of said respective classes and different types of learning patterns in said respective classes;
determining a statistical similarity between the feature quantities of respective regions extracted for the unknown input patterns and the statistical information about said feature quantity of the corresponding respective classes;
accumulating a number of similarities corresponding to an order of the class of respective learning patterns included in the classes of predetermined upper orders of similarity with regard to the respective regions, after searching said statistical information about said feature quantities; and
outputting recognition result candidates from highest to lowest number of accumulated number of similarities of the learning pattern after an accumulation operation is completed for respective regions.

17. A method of recognizing input word patterns by extracting a feature quantity from input word pattern and matching the input word pattern with statistical information about feature quantities each obtained by classifying a plurality of learning patterns, said method comprising the steps of:
dividing the input word pattern into a plurality of regions;
extracting a feature quantity from each of said plurality of regions of the input word pattern;
classifying the plurality of learning patterns in each respective region based on the feature quantity of each region extracted for the plurality of respective learning patterns;

determining statistical information about said feature quantities of respective classes;

storing the statistical information about said feature quantities of respective classes and different types of learning patterns included in respective classes for respective regions as a dictionary;

determining a statistical similarity between the feature quantity of respective regions extracted for the unknown input word pattern and the statistical information about said feature quantities of corresponding classes;

determining a similarity between said respective learning patterns and said unknown input pattern based on the determined similarity and outputting a rough classification word candidate in an order of highest to lowest similarity of the learning pattern;

recognizing a vowel sequence of said unknown input word pattern;

storing the vowel sequence of respective learning patterns; and performing matching of the vowel sequence of respective learning pattern corresponding to respective rough classification word candidates and the vowel sequence of said unknown input word pattern and outputting fine classification candidates in an order of highest to lowest matching degree of the rough classification word candidate.

18. A method of recognizing the input word pattern by extracting a feature quantity from the input word pattern and matching the input word pattern with statistical information about feature quantities each obtained by classifying a plurality of learning patterns, said method comprising the steps of:

dividing the input word pattern into a plurality of parts;

extracting feature quantities from each respective part of said plurality of parts of said input word pattern;

classifying said plurality of learning patterns for each respective part, based on the feature quantity of each respective part extracted for said plurality of respective learning patterns;

determining statistical information about said feature quantity of respective classes;

storing the statistical information about the feature quantities of respective classes and different types of learning patterns included in respective classes, as a dictionary for respective parts;

determining a statistical similarity between the feature quantities of respective parts extracted for the unknown input word pattern and the statistical information about said feature quantity of corresponding respective classes within the dictionary storing means;

accumulating a number of similarities corresponding to an order of classes for respective learning patterns included in a class of a predetermined upper order from highest to lowest similarity for respective parts;

outputting rough classification word candidates with a rank in accordance with an order from highest to lowest number of accumulated number of similarities of the learning pattern after completing the accumulating operation for respective parts;

recognizing a vowel sequence of the unknown input word pattern;

storing the vowel sequence of respective learning patterns as a dictionary;

performing matching of the vowel sequence of respective learning word patterns corresponding to said rough classification word candidates extracted;

outputting a vowel sequence of said unknown input word pattern; and outputting fine classification word candidates with a rank in accordance with an order of highest to lowest matching degree of the rough classification word candidate.

* * * * *